US012560513B2

(12) United States Patent
Yagci et al.

(10) Patent No.: US 12,560,513 B2
(45) Date of Patent: *Feb. 24, 2026

(54) AUTOMATED TISSUE SECTION TRANSFER SYSTEM WITH HIGH THROUGHPUT

(71) Applicant: Clarapath, Inc., Hawthorne, NY (US)

(72) Inventors: Baris Yagci, Montclair, NJ (US); Eric Feinstein, New Canaan, CT (US); Partha P. Mitra, New York, NY (US); Janak Sewkarran, New York, NY (US); Cong Zhang, New York, NY (US); Robert Shusko, Merrick, NY (US)

(73) Assignee: Clarapath, Inc., Hawthorne, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,730

(22) Filed: Feb. 15, 2024

(65) Prior Publication Data

US 2024/0310252 A1 Sep. 19, 2024

Related U.S. Application Data

(63) Continuation of application No. 17/866,725, filed on Jul. 18, 2022, now Pat. No. 11,906,398, which is a
(Continued)

(51) Int. Cl.
*G01N 1/06* (2006.01)
*B01L 3/00* (2006.01)
(Continued)

(52) U.S. Cl.
CPC ................ *G01N 1/06* (2013.01); *B01L 3/508* (2013.01); *G01N 1/36* (2013.01);
(Continued)

(58) Field of Classification Search
None
See application file for complete search history.

(56) References Cited

U.S. PATENT DOCUMENTS

| | | | |
|---|---|---|---|
| 4,569,647 A | 2/1986 | McCormick | |
| 5,821,195 A | 10/1998 | Sandbrink et al. | |

(Continued)

FOREIGN PATENT DOCUMENTS

| | | |
|---|---|---|
| JP | 2016085173 A | 5/2016 |
| WO | 2015046202 A1 | 4/2015 |
| WO | 2022056001 A1 | 3/2022 |

OTHER PUBLICATIONS

European Search Report in European Application No. EP/21867515.5 mailed Oct. 8, 2024.
(Continued)

*Primary Examiner* — Daniel S Larkin
(74) *Attorney, Agent, or Firm* — Greenberg Traurig, LLP; Roman Fayerberg; Richard Brooks

(57) ABSTRACT

There is provided an automated system for preparing tissue samples that comprises one or more microtomes, a hydration system, and a processor, the processor being programmed to initiate facing, by one or more microtomes, of a first tissue block comprising a first tissue sample embedded in an embedding material, and cause the first tissue block to be hydrated by the hydration system for a first predetermined time, and initiate facing, by one or more microtomes, of a second tissue block while the first tissue block is being hydrated, the second tissue block comprising a second tissue sample embedded in an embedding material, and cause the second tissue block to be hydrated by the hydration system for a second predetermined time, and to initiate the one or more microtomes to begin sectioning of the first tissue block while the second tissue block is being hydrated.

27 Claims, 17 Drawing Sheets

Related U.S. Application Data continuation of application No. 17/469,351, filed on Sep. 8, 2021, now Pat. No. 11,428,609.

(60) Provisional application No. 63/077,433, filed on Sep. 11, 2020, provisional application No. 63/075,441, filed on Sep. 8, 2020.

(51) Int. Cl.
  *G01N 1/31* (2006.01)
  *G01N 1/36* (2006.01)

(52) U.S. Cl.
  CPC ... *B01L 2300/043* (2013.01); *B01L 2300/046* (2013.01); *B01L 2300/069* (2013.01); *B01L 2300/0809* (2013.01); *G01N 2001/065* (2013.01); *G01N 2001/315* (2013.01); *G01N 2001/366* (2013.01)

(56) References Cited

U.S. PATENT DOCUMENTS

| | | | |
|---|---|---|---|
| 6,130,186 | A | 10/2000 | Ward et al. |
| 6,475,953 | B1 | 11/2002 | Ward et al. |
| 7,507,775 | B2 | 3/2009 | Leatherman et al. |
| 7,645,720 | B2 | 1/2010 | Leatherman et al. |
| 7,652,072 | B2 | 1/2010 | Leatherman et al. |
| 7,700,797 | B2 | 4/2010 | Leatherman et al. |
| 7,723,265 | B2 | 5/2010 | Xu et al. |
| 7,879,916 | B2 | 2/2011 | Leatherman et al. |
| 7,935,842 | B2 | 5/2011 | Policello et al. |
| 7,964,552 | B2 | 6/2011 | Herzog et al. |
| 8,734,821 | B2 | 5/2014 | Hollis et al. |
| 9,034,960 | B2 | 5/2015 | Brown et al. |
| 11,428,609 | B2 | 8/2022 | Yagci et al. |
| 11,635,352 | B2 | 4/2023 | Pinto et al. |
| 11,906,398 | B2 | 2/2024 | Yagci et al. |
| 2003/0022271 | A1 | 1/2003 | Voneiff et al. |
| 2006/0134732 | A1 | 6/2006 | Kram et al. |
| 2007/0039435 | A1 | 2/2007 | Kokubo |
| 2007/0131611 | A1 | 6/2007 | Peng et al. |
| 2009/0137028 | A1 | 5/2009 | Ito et al. |
| 2011/0165615 | A1 | 7/2011 | Allen et al. |
| 2013/0019725 | A1 | 1/2013 | Magavi et al. |
| 2013/0216451 | A1 | 8/2013 | Hayworth et al. |
| 2014/0026683 | A1 | 1/2014 | Hayworth et al. |
| 2015/0168277 | A1 | 6/2015 | Magavi et al. |
| 2015/0300925 | A1 | 10/2015 | Enomoto |
| 2017/0205317 | A1 | 7/2017 | Zhang et al. |
| 2022/0074823 | A1 | 3/2022 | Yagci et al. |
| 2022/0074830 | A1 | 3/2022 | Pinto et al. |
| 2023/0046748 | A1 | 2/2023 | Yagci et al. |
| 2023/0314283 | A1 | 10/2023 | Pinto et al. |

OTHER PUBLICATIONS

International Search Report and Written Opinion in PCT International Application No. PCT/US2021/049469 mailed Dec. 23, 2021.

200

250 — Face block 1…n serially

252 — Move blocks 1…n serially into hydration system

254 — Track hydration time in chamber

256 — Section Block 1, when hydrated

258 — Transfer cut sections to transfer medium

260 — Section Block 2, when hydrated

262 — Transfer cut sections to transfer medium

264 — Section Block n, when hydrated

266 — Transfer cut sections to transfer medium

Tandem Microtome Operation

Parallel Microtome Operation

Parallel Microtome Operation

700

800

1300

AUTOMATED TISSUE SECTION TRANSFER SYSTEM WITH HIGH THROUGHPUT

RELATED APPLICATIONS

This application is a continuation of U.S. application Ser. No. 17/866,725, filed Jul. 18, 2022, now U.S. Pat. No. 11,906,398, which is a continuation of U.S. patent application Ser. No. 17/469,351, filed on Sep. 8, 2021, now U.S. Pat. No. 11,428,609, which claims the benefit of and priority to U.S. Provisional Application No. 63/075,441, filed on Sep. 8, 2020, and U.S. Provisional Application No. 63/077, 433, filed on Sep. 11, 2020, each of which are incorporated herein by reference in their entireties.

FIELD

The present disclosure relates to automated systems and methods for sectioning tissue from biological tissue blocks, and, more particularly, to systems and methods providing higher throughput in such automated apparatus.

BACKGROUND

Traditional microtomy, the production of micron-thin tissue sections for microscope viewing, is a delicate, time consuming manual task. Recent advancements in the digital imaging of tissue sample sections have made it desirable to slice blocks of specimen very quickly. By way of example, where tissues are sectioned as part of clinical care, time is an important variable in improving patient care. Every minute that can be saved during sectioning of tissue for intra-operative applications of anatomic pathology, for example in examining margins of lung cancers to determine whether enough tissue has been removed, is of clinical value. To create a large number of sample sections quickly, it is desirable to automate the process of cutting tissue sections from the supporting tissue block by a microtome blade and facilitating the transfer of cut tissue sections to slides.

Every minute that can be saved during sectioning of tissue for intra-operative applications of anatomic pathology, can be critical. It would be advantageous to provide an automated system which can increase the tissue sectioning, saving time.

SUMMARY

There is a need for improvements of systems and methods for preparation of tissue samples. The present disclosure is directed toward solutions to address this need, in addition to having other desirable characteristics.

In some aspects, the present disclosure provides an automated system for preparing tissue samples that comprises one or more microtomes, a hydration system, and a processor, the processor being programmed to initiate facing, by one or more microtomes, of a first tissue block comprising a first tissue sample embedded in an embedding material, and cause the first tissue block to be hydrated by the hydration system for a first predetermined time, and initiate facing, by one or more microtomes, of a second tissue block while the first tissue block is being hydrated, the second tissue block comprising a second tissue sample embedded in an embedding material, and cause the second tissue block to be hydrated by the hydration system for a second predetermined time, and to initiate the one or more microtomes to begin sectioning of the first tissue block while the second tissue block is being hydrated.

In some embodiments, the one or more microtomes comprise a first microtome and a second microtome. In some embodiments, the processor can be programmed to initiate facing, by a first microtome, of the first tissue block, and cause the first tissue block to be hydrated by the hydration system and initiate facing, by the first microtome, of the second tissue block while the first tissue block is in the hydration system, cause the second tissue block to be hydrated by the hydration system, and initiate sectioning, by a second microtome, of the hydrated first tissue block while the second tissue block is being hydrated. In some embodiments, the processor is further programmed to initiate facing, by a first microtome, the first tissue, cause the first tissue block to be hydrated the hydration system, initiate the sectioning, by the first microtome, of the hydrated first tissue block, facing, by a second microtome, the second tissue block, cause the second tissue block to be hydrated the hydration system, and initiate the sectioning, by the second microtome, of the hydrated second tissue block, wherein at least one of the facing, hydrating, and sectioning by the second microtome is performed in parallel to the facing, hydrating, and sectioning by the first microtome.

In some embodiments, the system further comprises one or more transfer medium units configured to transfer one or more sections from the first tissue block and the second tissue block to one or more slides. In some embodiments, the system further comprises one or more tissue block handlers configured to transfer the first tissue block and the second tissue block between the one or more microtomes and the hydration system. In some embodiments, the system can further include that the processor is in communication with the one or more tissue block handlers and is being programmed to control the movement of the first tissue block and the second tissue block between the one or more microtomes and the hydration system. In some embodiments, the system further comprises a tissue block tray configured to receive the first tissue block and the second tissue block. In some embodiments, the system further includes a cooling system. In some embodiments, the system can further include that the hydration system comprises a hydration chamber configured to receive the first tissue block and the second tissue block inside the hydration chamber. In some embodiments, the system can further include that the hydration system is positioned in proximity to the one or more microtomes and is configured to hydrate the first tissue block and the second tissue block at the one or more microtomes. The processor can be further programmed, in some embodiments, to cause the first tissue block and the second tissue block to be moved to the hydration system for the first predetermined time and the second predetermined time, respectively.

In some aspects, the present disclosure also provides for a method for batch processing tissue blocks. In some embodiments, the method involves initiating, by a processor, facing, by one or more microtomes controlled by the processor, of a first tissue block comprising a first tissue sample embedded in an embedding material, causing, by the processor, the first tissue block to be hydrated for a first predetermined period of time, initiating, by the processor, facing, by the one or more microtomes, a second tissue block while the first tissue block is being hydrated, the second tissue block comprising a second tissue sample embedded in an embedding material, causing, by the processor, the second tissue block to be hydrated for a second predetermined period of time, and initiate, by the processor, the one or more microtomes to begin sectioning of the first tissue block while the second tissue block is being hydrated. In some embodiments, the method can further include moving, by a tissue block handler in communication with the processor, the first tissue block and the second tissue block from the one or more microtomes to the hydration system. In some embodiments, the one or more microtomes can comprise multiple microtomes. In some embodiments, the method can further include transferring, by one or more transfer medium units in communication with the processor, one or more sections sectioned from the first tissue block and the second tissue block from the one or more microtomes to one or more slides.

In some aspects, the present disclosure also provides for a method for processing tissue samples, comprising facing, by a first microtome, a first tissue block comprising a first tissue sample embedded in an embedding material, hydrating the first tissue block by a hydration system for a predetermined period of time, facing, by the first microtome, a second tissue block while the first tissue block is being hydrated, the second tissue block comprising a second tissue sample embedded in an embedding material, hydrating the second tissue block by the hydration system, and sectioning, by a second microtome, a sample from the hydrated first tissue block while the second tissue block is being hydrated. In some embodiments, the method can further include transferring one or more sections sectioned from the first tissue block from the second microtome to one or more slides.

In some aspects, the present disclosure provides a method for processing tissue samples that comprises facing, by a first microtome, a first tissue block comprising a first tissue sample embedded in an embedding material, hydrating the first tissue block by a hydration system for a first predetermined period of time, sectioning, by the first microtome, the hydrated first tissue block, facing, by a second microtome, a second tissue block comprising a second tissue sample embedded in an embedding material, hydrating the second tissue block by the hydration system for a second predetermined period of time, and sectioning, by the second microtome, the hydrated second tissue block, wherein at least one of the facing, hydrating, and sectioning by the second microtome is performed in parallel to the facing, hydrating, and sectioning by the first microtome. In some embodiments, the method can further include transferring one or more sections sectioned from the first tissue block from the first microtome and the second microtome to one or more slides.

In some aspects, the present disclosure provides a histology system that comprises a microtome configured to expose a face of a tissue block comprising a tissue sample embedded in an embedding material and remove one or more tissue sections from the sample, a hydration system configured to hydrate the tissue block by depositing a hydrating liquid on the face of the tissue block, and a transfer system configured to transfer the one or more tissue sections from the microtome to one or more slides. In some embodiments, the hydration system is configured to produce droplet condensation of the hydrating liquid and deposit the condensation on the face of the tissue block. In some embodiments, the hydration system comprises an ultrasonic humidifier. In some embodiments, the hydration system comprises a sprayer assembly configured to spray the face of the tissue block with droplets of the hydrating liquid. In some embodiments, the hydration system comprises a hydration chamber configured to receive one or more tissue blocks and a humidifier in communication with the hydration chamber to provide humid air to the hydration chamber. In some embodiments, the hydrating liquid is deposited by spraying droplets of the hydrating liquid onto the face of the tissue sample block. In some embodiments, the hydrating liquid includes a surfactant. In some embodiments, the surfactant is an oil soluble surfactant. In some embodiments, the surfactant is a superspreading surfactant. In some embodiments, the method can further include a cooling system configured to cool the tissue block. In some embodiments, the hydration system is positioned in proximity to the microtome and configured to hydrate the tissue block at the microtome.

In some aspects, the present disclosure also provides a method for tissue block hydration that comprises exposing a face of a tissue block comprising a tissue sample embedded in an embedding material, depositing a hydrating liquid on the face of the tissue block, and allowing the hydrating liquid to hydrate the tissue sample and sectioning one or more tissue sections from the hydrated tissue sample. In some embodiments, the hydrating liquid is deposited by causing condensation of the hydrating liquid on the face of the tissue block. In some embodiments, the hydrating liquid is deposited by spraying droplets of the hydrating liquid onto the face of the tissue sample block. In some embodiments, the hydrating liquid includes a surfactant. In some embodiments, the surfactant is an oil soluble surfactant. In some embodiments, the surfactant is a superspreading surfactant.

In some embodiments, the method further comprises positioning the tissue block in a microtome chuck in proximity to a microtome, the microtome being configured to section the one or more section from the hydrated tissue sample, and depositing the hydrating liquid on the face of the tissue sample positioned at the microtome chuck. In some embodiments, the method can further include positioning the tissue block in a hydration chamber, and providing air with vapor of the hydrating liquid to the hydration chamber, such that droplets of the hydrating liquid condense on the face of the tissue block positioned in the hydration chamber. In some embodiments, the method can further include cooling the tissue block to induce droplets of the hydrating liquid to condense on the face of the tissue block.

These and other embodiments of the present disclosure are described in more detail below.

BRIEF DESCRIPTION OF DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein.

Figure 1A:
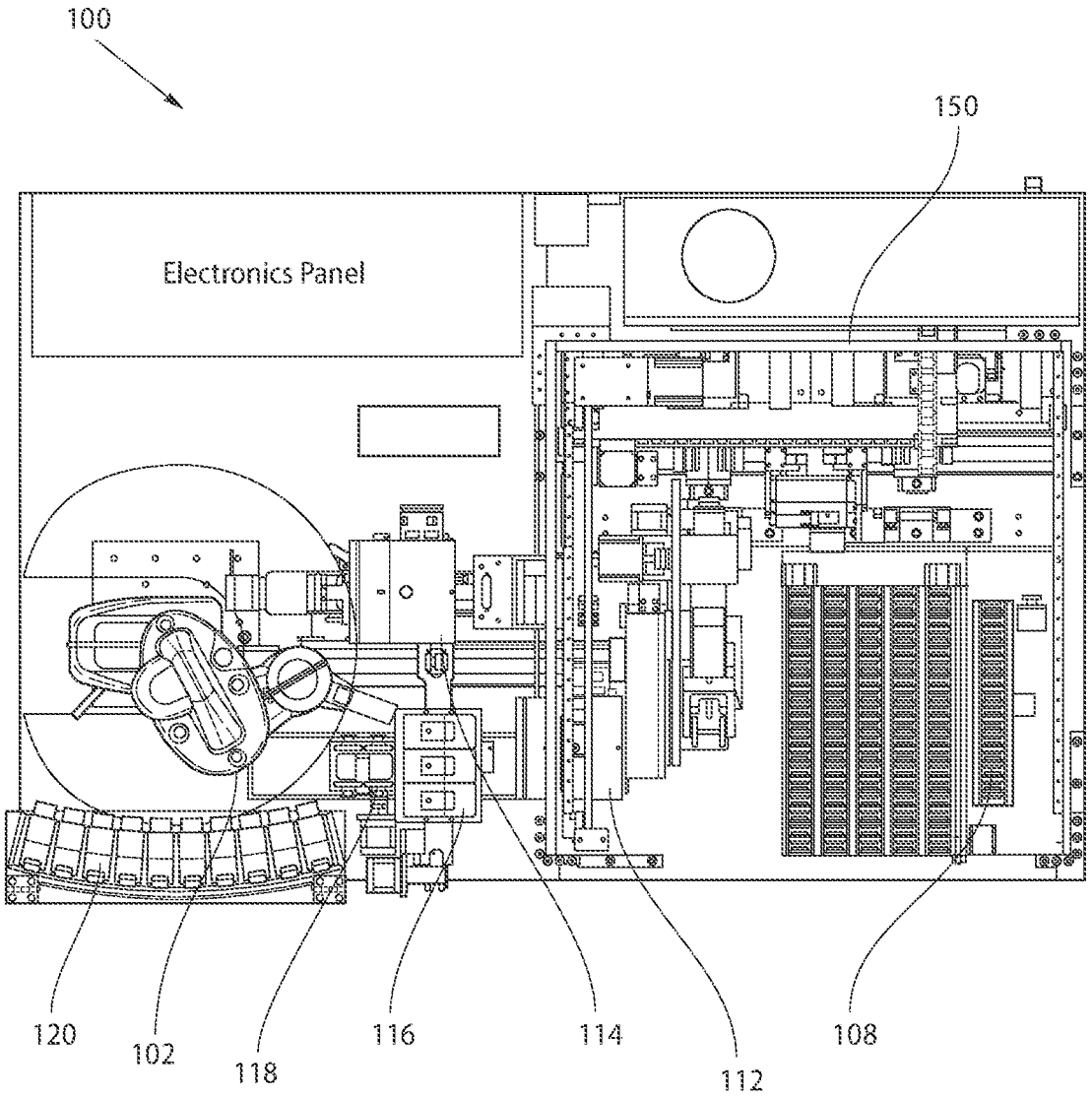
FIG. 1A is an above view illustration of a sample system layout in accordance with some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present disclosure relates to systems and methods for processing tissue blocks containing biological samples of tissue. The processing can include automated systems designed to face tissue blocks and cut tissue sections from the tissue block. The cut tissue sections can be transferred to a transfer/transport medium such as tape and then, from the transfer medium to slides for pathology or histology examination. The presently disclosed methods and systems may be employed in connection with manual as well as automated microtomy methods and systems.

The present disclosure can implement systems and methods to increase throughput in an automated tissue sectioning apparatus to decrease the tissue sample preparation time for a plurality of tissue blocks. In some embodiments, the present disclosure implements an automated system and method that maximizes the number of tissue blocks being processed by coordinating the various processing steps in an increased efficiency manner and minimizing delays in preparation of tissue samples. The present disclosure provides several systems and methods that can improve the speed of the automated apparatus, and these systems and methods can be used alone or in combination.

In some embodiments, the system and method of the present disclosure can implement an automated apparatus that has more than one microtome so that more than one path through the system can be utilized in tandem and/or parallel. Providing more than one microtome for facing or sectioning the tissue block is one way in which multiple paths for the same task (redundancy) can be provided, it being understood than other redundancies can be built into the system/process. In some embodiments of the present disclosure, the system and method of the present disclosure can have parallel processing—moving a block from the chuck to block holder and preparing a slide at the same time. In some embodiments, the tissue block can be processed in tandem.

In some embodiments, the present disclosure provides a method for batch processing sample blocks, the method comprising facing, by a microtome, a block containing a biological sample; moving the first tissue block into a hydration chamber for a predetermined period of time; sectioning, by the microtome, a sample from the hydrated block; and transferring the sample from the block to a transfer medium for analysis.

In some embodiments, the present disclosure provides a tandem method for batch processing sample blocks, the method comprising: facing, by a first microtome, a first tissue block containing a first biological sample; moving the first tissue block into a hydration chamber for a predetermined period of time; facing, by the first microtome, a second tissue block containing a second biological sample while the first tissue block is in the hydration chamber; moving the second tissue block into the hydration chamber; sectioning, by a second microtome, a sample from the hydrated first tissue block while the second tissue block is in the hydration chamber; and transferring the sample from the first tissue block to a transfer medium for analysis.

In some embodiments, the present disclosure provides a parallel method for batch processing sample blocks, the method comprising facing, by a first microtome, a first tissue block containing a first biological sample; moving the first tissue block into a hydration chamber for a predetermined period of time; sectioning, by the first microtome, a first sample from the hydrated first tissue block; transferring the first sample from the block to a transfer medium for analysis; facing, by a second microtome, a second tissue block containing a second biological sample; moving the second tissue block into the hydration chamber for the predetermined period of time; sectioning, by the second microtome, a second sample from the hydrated second tissue block; and transferring the second sample from the second tissue block to the transfer medium for analysis, wherein at least one of the facing, hydrating, and sectioning by the second microtome is performed in parallel to the facing, hydrating, and sectioning by the first microtome.

The present disclosure further provides methods and systems for enhanced hydration of tissue blocks during microtomy. In some embodiments, the tissue blocks can be hydrated in a hydration chamber. In some embodiments, the tissue blocks can be hydrated directly at the microtome.

FIGS. 1A through 13, wherein like parts are designated by like reference numerals throughout, illustrate an example embodiment or embodiments of improved operation for processing tissue blocks containing biological samples, according to the present disclosure. Although the present disclosure will be described with reference to the example embodiment or embodiments illustrated in the figures, it should be understood that many alternative forms can embody the present disclosure. One of skill in the art will additionally appreciate different ways to alter the parameters of the embodiment(s) disclosed, such as the size, shape, or type of elements or materials, in a manner still in keeping with the spirit and scope of the present disclosure.

In some embodiments, the present disclosure can be used with tissue blocks containing biological samples, such as tissue. The system and method of the present disclosure can be used for efficiently processing and separating the tissue blocks. The tissue samples are typically embedded in a preservation material, such as paraffin wax or a similar material. The embedding process can include any combination of processes for producing tissue blocks which are designed to be cut by microtomes 104. For example, biological samples can be encased within a mold along with a liquid substance, such as wax or epoxy, that can harden to produce the desired shaped block. Once tissue blocks have been created they can be inserted into an automated system 100 for cutting into samples that can be placed on slides for observation.

In particular, as is discussed in more detail below, the automated system 100 is designed to accept one or more tissue blocks, where each tissue block comprises a tissue sample embedded in an embedding or preservation material. The tissue blocks are delivered to one or more microtomes. Next, the one or more tissue blocks are "faced" by removing the layer of the preservation material in which the tissue is embedded to expose a large cross section of the tissue sample, for example, the front face of the tissue sample. Such exposed surface of the tissue sample of the tissue block is referred to as a blockface. Once the tissue block is faced, the tissue block can be hydrated and cooled prior to sectioning (cutting tissue sections that can be placed on slides for observation) the tissue block. The tissue blocks can be hydrated and cooled in a separate hydration chamber or can be hydrated and cooled in place at the one or more microtomes. The sections of the tissue sample are transferred from the one or more microtomes to slides for further processing.

Figure 1B:
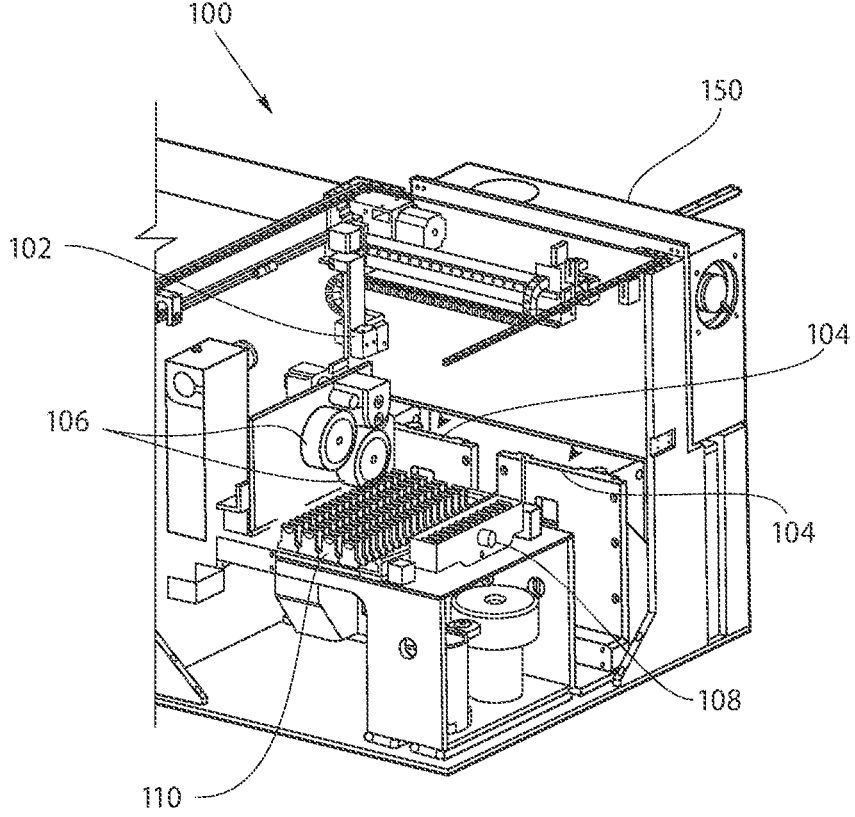
FIGS. 1B and 1C are isometric view illustrations of a sample system layout in accordance with some embodiments of the present disclosure.
Figure 1C:
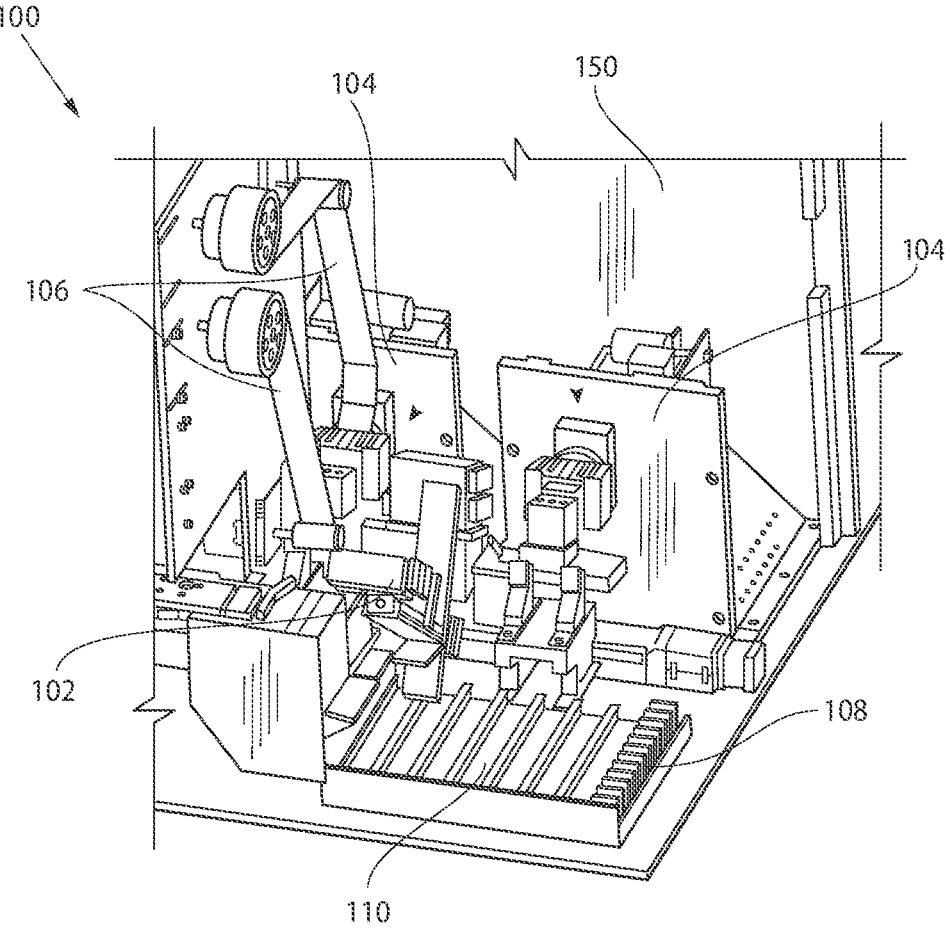

Referring to FIGS. 1A, 1B, and 1C, in some embodiments, an automated pathology system 100 is provided for preparing tissue samples. Such systems can be configured for increased throughput during tissue sectioning. The automated system 100 can be designed to include a block handler 102, one or more microtomes 104, a transfer medium 106 (e.g., a tape), a hydration chamber 108, and a block tray 110. The block tray 110 can be a drawer like device designed to hold a plurality of tissue blocks and can be placed into the automated system 100 for access by the block handler 102. The block tray 110 can have multiple rows each designed to hold one or more tissue blocks and can have sufficient spacing such that the block handler 102 can index, grab, and remove one tissue block at a time. In some embodiments, the block tray 110 can be designed to securely hold the tissue blocks by using, for example, a spring-loaded mechanism, so that the tissue block do not shift or fall out of the block tray 110 during handling. In some embodiments, the spring-loaded mechanism can further be designed such that the block handler 102 can pull the tissue blocks out without damaging or deforming them. For example, the pitch of the tissue block within the block tray 110 can enable the block handler grippers of the block handler 102 to access the paraffin blocks without interfering with adjacent blocks. The block handler 102 can include any combination of mechanisms capable of grasping and/or moving tissue blocks in and out of a microtome 104, specifically, into a chuck of the microtome 104. For example, the block handler 102 can include a gantry, a push and pull actuator, a gripper on a Selective Compliance Assembly Robot Arm (SCARA) robot.

Referring to FIG. 1A, in some embodiments, the automated system 100 can include a combination of mechanism to transfer a section cut from the tissue block onto the transfer medium 106 to be transferred to a slide for analysis. The combination of mechanism can include a slide adhesive coater 112, a slide printer 114, slide input racks 116, a slide singulator that picks a slide from a stack of slides 118, and slide output racks 120. This combination of mechanisms work together to prepare the sample on the slide and prepare the slide itself.

In some embodiments, the one or more microtomes 104 can include any combination of microtomes known in the art, specifically, for precisely sectioning tissue blocks. For example, the one or more microtomes 104 can be a rotary, cryomicrotome, ultramicrotome, vibrating, saw, laser, etc. based designs. In some embodiments, the one or more microtomes 104 can be designed to move the chuck up and down while also being able to move laterally (e.g., in a direction of the thickness of a block). The one or more microtomes 104 can include any combination of components for receiving and sectioning a tissue block. For example, the one or more microtomes 104 can include a knife-block with a blade handler for holding a changeable knife blade and a specimen holding unit with a chuck head and a chuck adapter for holding a tissue block.

The one or more microtomes 104 is configured to cut a tissue section from a tissue sample enclosed in a supporting block of preservation material such as paraffin wax. The one or more microtomes 104 can hold a blade aligned for cutting sections from one face of the tissue block—the block cutting face or a block face. For example, a rotary microtome, can linearly oscillate a chuck holding the specimen block with the cutting face in the blade-cutting plane, which combined with incremental advancement of the block cutting face into the cutting plane, the microtome 104 can successively shave thin tissue sections off the block cutting face.

In operation, the one or more microtomes 104 is used to face and/or sections tissue blocks. When the tissue block is initially delivered to the one or more microtomes 104, the tissue block can be faced. Facing is removing a layer of preservation material and exposing the large cross section of the tissue. That is, the preservation material with the tissue sample embedded in it can first be subjected to sectioning with relatively thick sections to remove the 0.1 mm-1 mm layer of paraffin wax on top of the tissue sample. When enough paraffin has been removed, and the complete outline of the tissue sample is exposed, the block is "faced", and ready for acquisition of a processable section that can be put on a glass slide, and the exposed face is referred to as a blockface. For the facing process, the one or more microtomes 104 can shave off sections of the block until an acceptable portion of the sample within the block is revealed. In some embodiments, the system can include on or more facing cameras to identify when an acceptable portion of the sample within the block is revealed. For the cutting process, the one or more microtomes 104 can shave off a sample section of the block with an acceptable thickness to be placed on a slide for analysis.

Once the block is faced, in some embodiments, the faced tissue blocks can be hydrated (for example, in a hydration chamber 108 or directly at the one or more microtomes) for a period of time in a hydrating fluid. In addition to being hydrated, the tissue blocks can be cooled. The cooling system can be part of the hydration chamber 108 or a separate component from the hydration chamber 108. In some embodiments, the cooling system can provide cooling to all the components within the sectioning chamber 150. The sectioning chamber 150 can provide insulation enclosing the one or more microtomes 104, the hydration chamber 108, the block tray 110, the blade holder and the blade exchanger of the microtome 104, and the cameras. This way there are minimal number of openings in the insulation, which can increase the efficiency and effectiveness within the sectioning chamber 150. Regardless of location, the cooling system can have a mini compressor, a heat exchanger, and an evaporator plate to create a cool surface. The air in the sectioning chamber can be pulled in and passed over the evaporator plate, for example, using fans. The cooled air can circulate in the sectioning chamber 150 and/or hydration chamber 108 to cool the paraffin tissue blocks. The mass of equipment in the cooling chamber provide a thermal inertia as well. Once the chamber is cooled, its temperature can be maintained more effectively, for example, if an access door is opened by the user to remove the block tray 110. In some embodiments, the temperature of the tissue block is maintained between 4° C. to 20° C. Keeping the tissue blocks cool can benefit the sectioning process as well as the hydration process.

Once the tissue block has been sufficiently hydrated, in some embodiments, it is ready for sectioning. Essentially, the one or more microtomes cuts thin sections of the tissue samples from the tissue block. The tissue sections can then be picked up by the transfer medium 106, such as a tape, for subsequent transfer for placement on the slides. In some embodiments, depending on the microtome 104 setup of the automated system 100, the automated system 100 can include a single or multiple transfer medium 106 units. For example, in tandem operation, the transfer medium 106 can be associated with a polishing and sectioning microtome 104, whereas in a parallel operation, a separate transfer medium 106 can be associated with each microtome 104 within the automated system 100. In automated systems, each of these processes/steps of facing, hydration, sectioning, and transfer to slides are computer controlled rather than performed in the manual workflow by the histotechnician.

Referring back to FIGS. 1A, 1B, and 1C, in some embodiment, the transfer medium 106 can be designed in a manner in which a tissue section cut from the tissue sample in the tissue block adheres and can then be transported by the moving transfer medium 106. For example, the transfer medium 106 can include any combination of materials designed to physically (e.g., electrostatic) and/or chemically adhere to the sample material. The transfer medium 106 can be designed to accommodate a large number of tissue sample sections cut from the block to be transferred to slides to be included on slides for evaluation. In some embodiments, the transfer medium 106 can be replaced by a water channel to carry tissue. The automated system 100 can include any additional combination of features for use in an automated microtome design.

Figure 2:
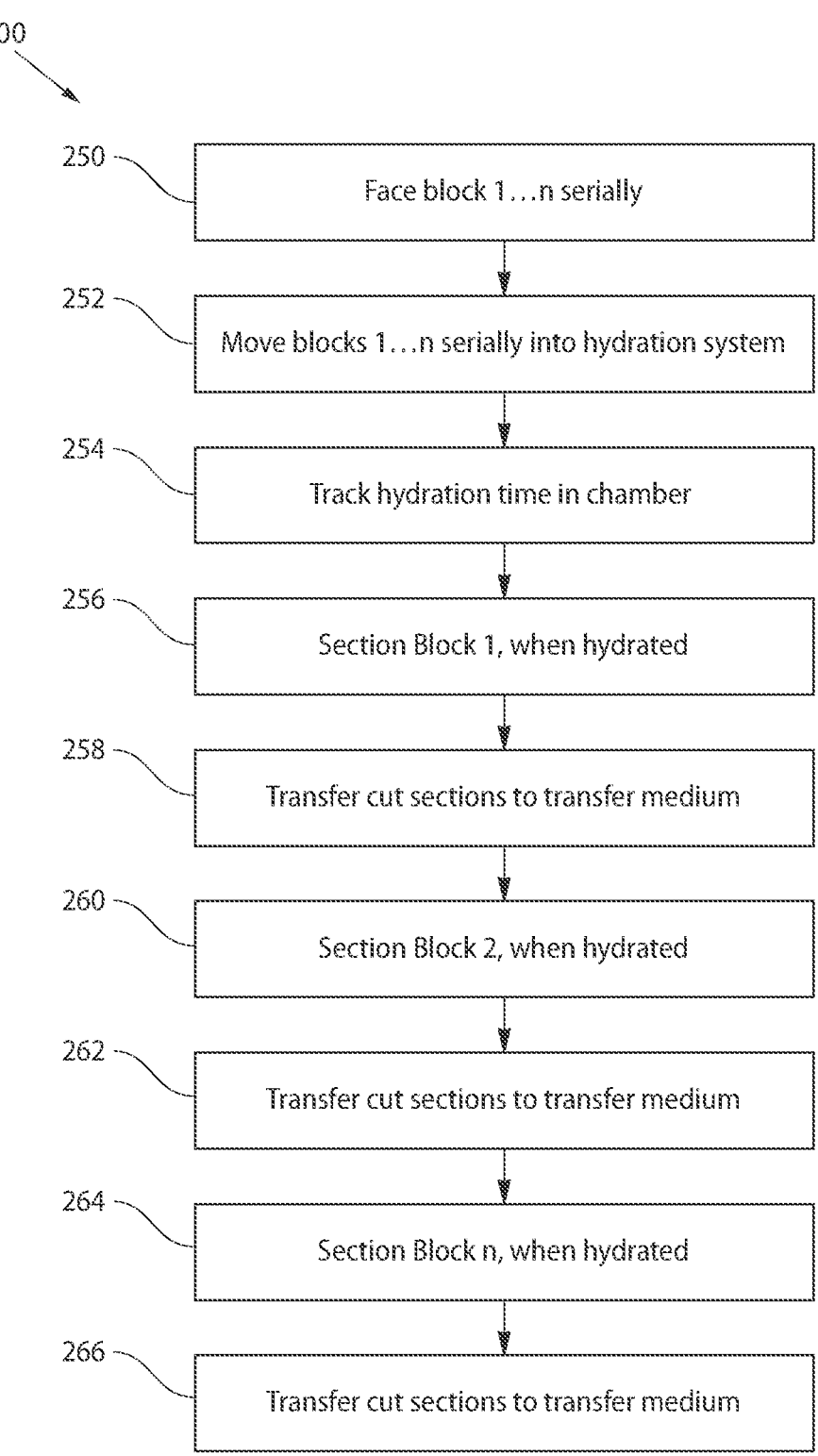
FIG. 2 is a flow chart illustrating the batch processing for increasing throughput in the automated tissue sectioning system in accordance with some embodiments of the present disclosure.

Referring to FIG. 2, in some embodiments, the automated system 100 can follow process 200 to face, hydrate, section, and transport cut tissue sections to slides in an efficient automated fashion. In some embodiments, each tissue block can have a machine-readable code or identifier on them. The machine-readable code can include any combination of information for use by the automated system 100. For example, the machine-readable code can identify the tissue types in the blocks, such as block 1 has colon tissue, block 2 has tonsil tissue, and block 3 has breast tissue. The information read from the machine-readable code can then be used for other functions. For example, based on the tissue type, the automated system 100 can determine the hydration time for each tissue type and the block processing can be optimized appropriately. Different tissue types may require different length of times to be hydrated. The hydration time may also depend on the size of the tissue sample. Under-hydrated tissue sample may develop micro cracks when sectioned. On the other hand, overhydrated tissue sample may get too soft, which can adversely affect the cutting quality. Therefore, in some embodiments, an optimum length of time a tissue block should be hydrated can be estimated and used for each tissue block.

In some embodiments, the system process is provided with a lookup table with hydration times could be provided, based on prior experimentation, as to the appropriate hydration parameters depending on the tissue block size or tissue type (or combinations thereof). Such table may be generated, for example, based on prior experimentations with different tissue sample or may be an estimate based on biophysical/biochemical considerations. In some embodiments, tissue quality can be monitored, as a function of the hydration parameters, and the table can be updated. Apart from tissue type (which organ), other dependent variables such as age of block or processing/hydration state of block may need taken into consideration in generating such empirical data. In some embodiments, data-driven machine learning algorithms can be used to predict optimized parameters for processing, later optimize such parameters or both.

By implementing the process of FIG. 2, multiple blocks can be processed with overlapping simultaneous processing steps for multiple blocks. In general, the exemplary methods include one or more of steps 250-266. In some embodiments, in step 250, tissue blocks are faced serially starting with Block 1, followed by Block 2, and so on through Block n. Once faced, these tissue blocks are serially hydrated in the same order as they were faced in step 252. In step 254, the amount these tissue blocks are hydrated is monitored. In step 256, once Block 1 is sufficiently hydrated, it is sectioned at the one or more microtomes and the sections from Block 1 are picked up by the transfer medium in step 258. In step 260, the hydrated Block 2, the next tissue block in sequence, is sectioned and the sections from Block 2 are picked up by the transfer medium in step 262. This process is repeated until Blok n is hydrated in step 262, sectioned in step 264 and the sections from Block n are picked up by the transfer medium in step 264.

By way of a non-limiting example, the process of FIG. 2 is described in more detail. Initially, the user can place one or more tissue blocks onto the block tray 110 to be loaded into the automated system 100. In some embodiments, once the block tray 110 is in place, a scanner (e.g., a barcode scanner) attached to the block handler 102 can scan one or more machine readable codes (e.g., barcodes) printed on the paraffin tissue blocks in the block tray 110. The block tray 110 can be designed to expose these machine-readable codes to a scanner or reader for efficiency identification. In some embodiments, the block handler 102 can pick up the tissue blocks and position them in proximity to a fixed scanner to be identified. The block tray 110 and the sample chuck on the one or more microtomes 104 can be oriented such that the block handler 102 has the least number of degrees of freedom saving on cost and keeping its design simple. This can also decrease the number of moves every time a tissue block is transferred between the chuck on the one or more microtomes 104 and block tray 110, which can save time. Once a tissue block is identified, the block handler 102 can place the block on a microtome 104 for processing.

Next, the one or more microtome 104 can face the first tissue block using any combination of facing methods. The automated system 100 can face multiple blocks one by one and puts them in a hydration chamber in succession to thereby batch the sample processing. The block handler 102 can move the first faced tissue block into the hydration chamber 108 (however, in some embodiments, the hydration can take place at the one or more microtomes). The processor within the automated system 100 can then track hydration time of the first tissue block (and each subsequent tissue block) within the hydration chamber 108. The next tissue blocks can be similarly faced and hydrated. Once a predetermined period of time has passed (once the block is properly hydrated), the block handler 102 can move the first faced tissue block from the hydration chamber 108 into a chuck of the one or more microtomes 104. The first tissue block can be sectioned while the other blocks, which started hydration afterward in a sequential fashion, continue to hydrate. As the one or more microtome 104 cuts one or more sections from the faced portion of the first tissue block, the cut sections can be transferred to the transfer medium 106. Next, the second tissue block is hydrated and can be sectioned, followed by the next tissue block. The steps are repeated until all tissue blocks from the block tray 110 are processed.

The flow chart of FIG. 2 illustrates the automated steps in batch processing as it depicts the serial facing of the blocks (blocks 1 . . . n), serial movement of the blocks to a hydration chamber 108 within the automated system 100 and the movement on a first-in, first-out process (in response to the automated timing calculations) from the hydration chamber 108 to the chuck of a microtome 104 for sectioning by the one or more microtomes 104. As can be appreciated, this first-in, first-out method can improve the flow and efficiency of the automated system 100 as the other blocks can be hydrating while a hydrated block is being sectioned. In some embodiments, one or more block handler 102 can be programed to move the various blocks around throughout the process 200 to keep the most efficient flow. For example, the block handler 102 can move the faced block to the hydration chamber 108 and back to the chuck of the microtome 104 for tissue sectioning in accordance with preprogrammed timers, timed in accordance with the period of time needed for hydration.

By implementing the process 200 of FIG. 2, the automated system 100 can process multiple blocks in a batch format with overlapping simultaneous processing steps for multiple blocks rather than in a completely serial format which requires each block to be completely processed before beginning the processing of the next block. In some embodiments, batch facing can be done as a FIFO queue (First-in, First-out), such that a series of blocks are placed in hydration (e.g., the ice-water mixture) for a predetermined period of time. Once the first tissue block is sufficiently hydrated, the tissue block is ready for a polish cut and take (cut) sections from this first tissue block. In the meantime, the other blocks keep hydrating.

Figure 3:
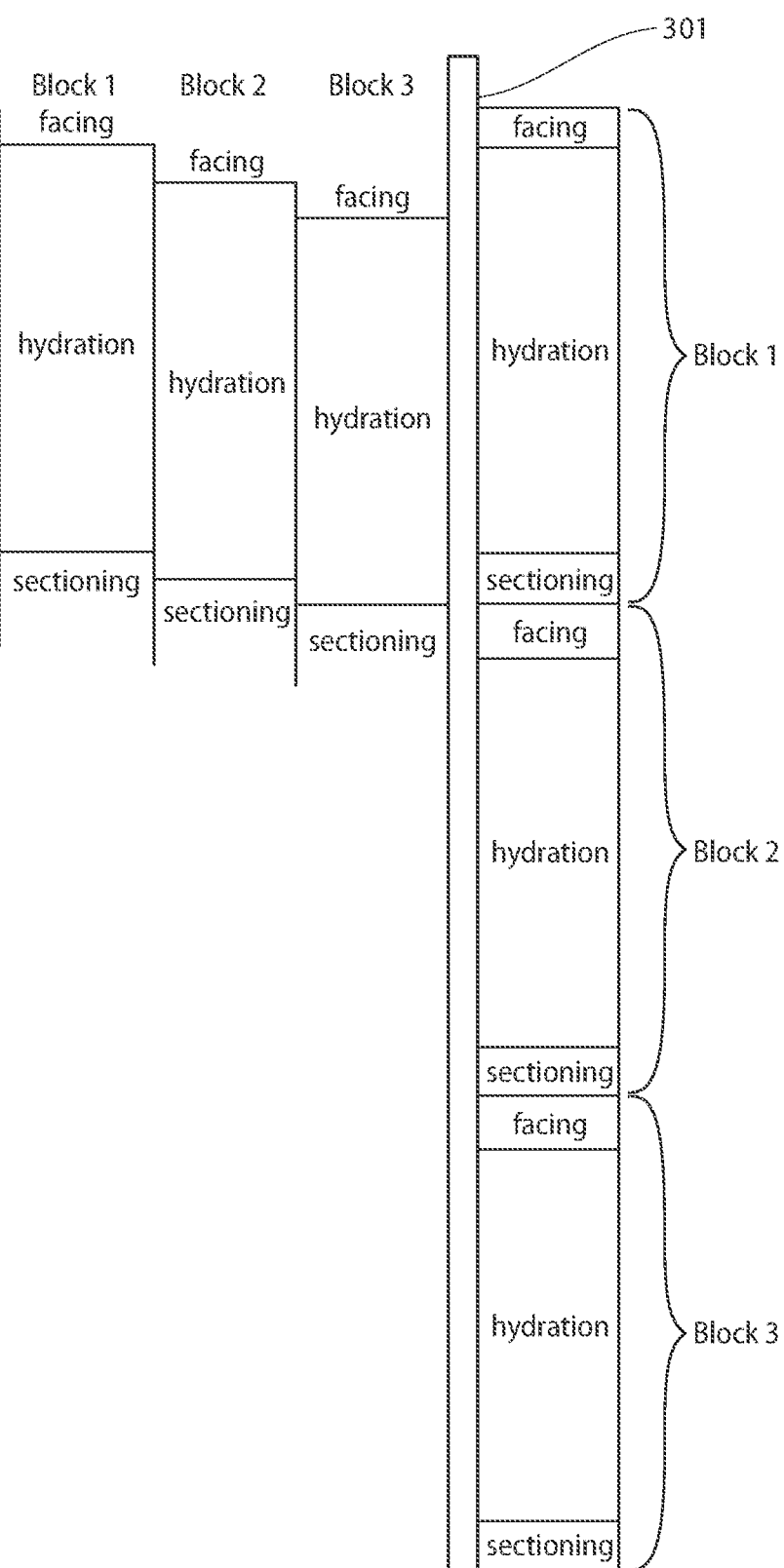
FIG. 3 is a chart comparing batch block processing with serial block processing with the batch processing shown on the left side of the black line and the serial processing shown on the right side of the black line in accordance with some embodiments of the present disclosure.

However, it should be noted that in some embodiments, a serial workflow or a combination of the serial workflow and the batch processing may be utilized. FIG. 3 illustrates the differences between the batch process and serial workflow. The diagram in FIG. 3 compares the batch workflow to a serial workflow in an example showing processing of three tissue blocks. The vertical axis 301 of the diagram in FIG. 3 represents the time passed with the blocks on left of the vertical black line representing the flow of samples in a batch block processing and the blocks on the right side of the vertical black line representing the flow of samples in a serial processing. In the serial process, a first tissue block would be faced by a microtome 104, then placed in the hydration chamber 108 for the required period of time and, once hydration is completed, the automated system 100 would continue by removing the tissue block, placing it on the chuck of a microtome 104 to cut tissue sections from the tissue block for transfer of the cut tissue sections to the transfer medium 106, such as a tape, within the automated apparatus.

In some embodiments, the batch processing can be performed by a single microtome 104 or multiple microtomes working in parallel or tandem. The one or more microtome 104 can continue to cut tissue blocks while other tissue blocks (samples not being cut) are hydrating to avoid a time delay. As shown in FIG. 3, one the left side, each of Block 1, Block 2, and Block 3 can be within a particular step of process 200 at the same time. In some embodiments the process flow may have staggered starts and finishes between adjacent blocks because a single block handler 102 can be responsible for managing movement and placement of all of the tissue blocks. The rows of FIG. 3 depict time increments so it can be appreciated that block facing takes a first period of time (e.g., one increment), sectioning takes a greater period of time (e.g., two increments—twice the amount of time for example) while hydration takes the longest period of time (e.g., 31 increments). In parallel batch processing, all three blocks are faced and at least some are sectioned, while in the same amount of time, only one block has been sectioned during serial processing. This increased number of time increments in the serial processing is depicted in the graph. This is in contrast to conventional processes, depicted on the right side, in which the full process steps are completed prior to starting any of the steps for the subsequent blocks. It should be noted that the currently disclosed embodiments with multiple microtomes can be utilized in both the batch processing and the serial workflow.

Note that the time increments in the graph are relative (non-dimensional) and do not depict a specified time period. Further note that the time increments are shown by way of example as the relative time for hydration, facing and sectioning can be different than that shown, however, in any event, hydration time will be a multiple of facing time so that batch processing within the automated apparatus will decrease overall time to thereby improve (increase) throughput of the system. Note the graph shows three blocks to illustrate the comparison as additional blocks would be sectioned in the typical process.

Referring back to FIGS. 1A, 1B, and 1C, in some embodiments, the automated system 100 can include multiple microtomes 104 operating within the automated system 100 to increase throughput of the automated system 100. It should be noted that while the system will be described in reference to two microtomes to aid in understanding of the present disclosure, any number of microtomes can be used pursuant to the present disclosure, and the number of microtomes can be even or odd. All of the microtomes 104 can be used in an automated fashion (for example, controlled by a processor or controller) to process (e.g., face and cut) tissue blocks in an efficient manner. In some embodiments, some of the microtomes 104 can be used for facing all the tissue blocks while other microtomes 104 can work in tandem to cut the faced tissue blocks, as discussed with respect to FIGS. 4A and 4B. In some embodiments, each of the multiple microtomes 104 can be used for both facing and cutting individual tissue blocks while the other microtomes 104 can work in parallel to face and cut the other individual tissue blocks, as discussed with respect to FIGS. 5A and 5B. In some embodiments, the blade holder for each microtome 104 are referenced to one another so that the number of polish cuts are less. In some embodiments, the microtome 104 can sit on the same base plate that has a machined hole pattern that will orient the microtomes 104 to each other in a predetermined orientation. Each blade holder and chuck on the microtomes 104 can also be referenced with respect to the microtome structure through machined holes and fasteners. Using machined holes may reference two microtomes to one and other very closely but not totally. The final referencing can be achieved through polish cuts on a sectioning microtome 104. The polish cuts can align the tissue block surface such that it is faced on a facing microtome 104 to the sectioning microtome 104. In some embodiments, the automated system 100 can be designed to reduce or substantially eliminate vibration between the microtomes 104 so that they do not negatively impact the cutting quality of one another. For example, vibration can be controlled passively by having a large mass around the moving microtome parts and softer couplings to the common base. This way the microtomes may act like rigid bodies. The critical path for vibrations on a given microtome is between the blade and the paraffin block, so the automated system 100 can be designed to minimize the number of connections and fasteners between to two end points to create a stiff system and control the vibrations.

In some embodiments, some of the microtomes can be dedicated to facing blocks and the other microtomes dedicated for sectioning the blocks. When the FIFO queue saturates after initial set of block hydration, the multiple microtomes would be working in tandem to finish up the work. In alternative workflow embodiments, multiple microtomes can be utilized for facing and sectioning. This way, the microtomes would be utilized 100% of the time. This speeds up the workflow by providing multiple paths for the same tasks (redundancy). The device/system can have the smart decision algorithms when to use which workflow.

Figure 4A:
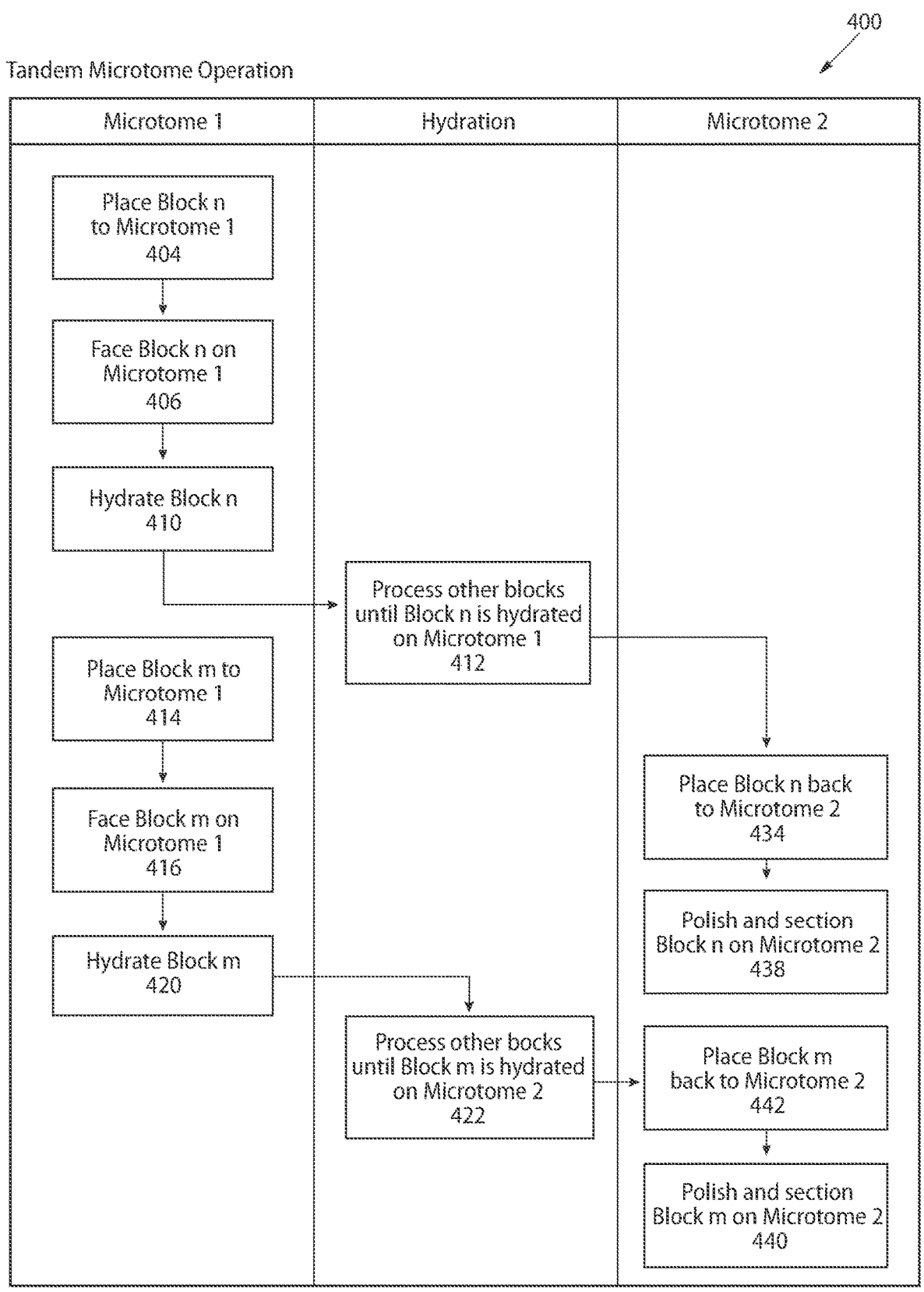
FIGS. 4A and 4B are flow charts describing the operation of multiple microtomes in tandem in accordance with some embodiments of the present disclosure.
Figure 4B:
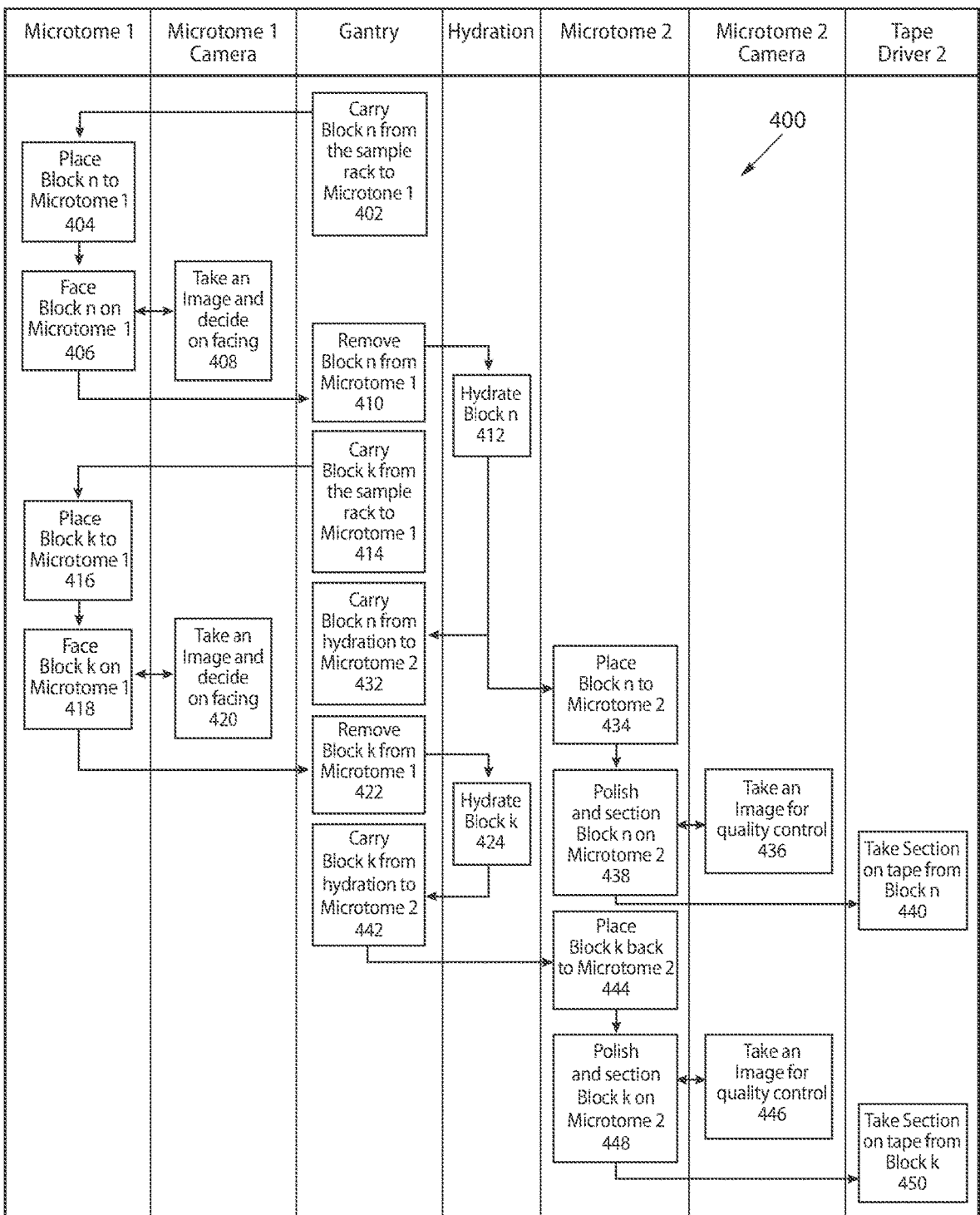

Referring to FIGS. 4A and 4B, in some embodiments, two or more microtomes 104 can be configured within the automated system 100 to work in tandem or serially. FIGS. 4A and 4B depict example tandem processes 400 for operating the automated system 100 with two or more microtomes 104 operating in tandem. FIGS. 4A-4B include various steps 402-450, but some of the steps are optional. Some of the steps are discussed in more detail below.

Initially, the user can place one or more tissue blocks onto the block tray 110 to be loaded into the automated system 100. In some embodiments, the block handler 102 can have a special gripper designed to pick up the tissue blocks and move them between the various locations discussed in FIGS. 4A and 4B. For example, the block handler 102 can have a special gripper designed to move the blocks from the block tray 110, to and from the chuck of the facing microtome 104, to and from the hydration chamber 108 to the sectioning microtome 104. The gripper can have finger like features that open and close, with this action the gripper hold the block and can exert enough force, for example, to safely remove the block from a chuck on the microtome 104. In some embodiments, the hydration chamber 108 can have a construction similar to the block tray 110 to hold the tissue blocks in place while allowing the block handler 102 to easily place and remove the blocks. A supervisory software can be provided to oversee the actions of the microtomes 104, the block handler 102 and the hydration chamber 108 to coordinate their actions.

Initially, in some embodiments, once the block tray 110 is in place, a barcode scanner attached to the block handler 102 can scan one or more barcodes printed on the paraffin tissue blocks in the block tray 110. In some embodiments, the block handler 102 can pick up the tissue blocks and position them in proximity to a fixed barcode scanner to be identified.

At step 402, once a tissue block(s) is identified, the block handler 102 can carry the first tissue block (block n) to one of the microtomes 104 for facing. For example, the block handler 102 can relocate the tissue block to the microtome 104 that has been designated as the facing microtome 104. In some instances, the block handler 102 can take the first tissue block from the block tray 110 and move it directed to one of the microtomes 104 for facing.

In some embodiments, a supervisory algorithm can use the machine-readable codes on the blocks to manage the locations in which the block handler 102 transports and places the blocks. For example, the block handler 102 can include a scanner to read the machine-readable codes on the blocks before picking them up. This way, the supervisory algorithm can identify and track the blocks while providing instructions to the block handler 102 as to which blocks to pick up and where to place them.

At step 404, the block handler 102 can place the first tissue block into the facing microtome 104 (e.g., in the chuck). In some embodiments, in preparation to receive a new block, the chuck of the facing microtome 104 can move up and retract back. Subsequent or simultaneous to the microtome 104 preparation, the block handler 102 can pick a block from the block tray 110 and bring it to the chuck of the facing microtome 104 and slide it from right to the left. In some embodiments, the chuck can have a spring-loaded clamping mechanism and the block handler 102 gripper can have strong enough to overcome this clamping force. Once the block is inserted in to the chuck the block handler 102 gripper opens up its finger like features and moves slightly towards the blade holder and disengages the block. The block is now securely held by the microtome chuck.

At step 406, with the first tissue block in place within the chuck, the facing microtome 104 can begin the facing process to remove the excess paraffin layer due to molding process on the tissue. In some embodiments, the microtome can move the microtome chuck to a position sensor which can be a touch sensor or a non-touch laser or sound based sensor. Each block can be made in molds that may have slightly different heights. The automated system 100 needs to know where the surface of the first tissue block is with respect to the plastic cassette. This sensor can determine the location of the surface of the block. For a touch sensor one can use a resistive sensor which changes the voltage out sensed by the controlling hardware. The change in voltage indicates the block surface touching the sensor. If the block thickness axis encoder is read at the same time, this gives the location of the block surface. For a non-touch laser implementation, a through beam laser sensor can be used. There would be an emitter and a receiver apart from each other but on the same line of sight. When advanced on the thickness axis (x-axis) the block would block this light path and once can observe the receiver side voltage reading changed. This voltage change and encoder reading on the thickness axis simultaneously indicates the location of the block surface. Regardless of type of sensors being used, the surface finding sensor can be placed at a known location with respect to the microtome blade. After surface detection the chuck can be moved to the sectioning position as close as possible to the blade in the vertical plane. After a few up and down microtome cycles the surface of the first tissue block catches the blade.

At step 408, in some embodiments, a strategically placed camera can be provided to capture images of the first tissue block as it is being cut. The camera can be designed to provide image data to determines when enough sections are taken, and a large cross-section of the tissue is exposed. During the facing process paraffin chips are created as a waste product. In some embodiments, these paraffin chips can be blown off by an air blade on the chuck and sucked by a vacuum on the blade holder.

At step 410, the block handler 102 can remove the first tissue block from the facing microtome 104 and places the first tissue block into the hydration chamber 108. Removing the block from the facing microtome 104 can be the reverse of the block placement on the chuck from step 406, but with the destination being the hydration chamber 108.

At step 412 the first tissue block hydrates within the hydration chamber 108 for a predetermined period of time. For example, the blocks can be designed to spend approximately 10 to 15 minutes in the hydration chamber 108. The supervisory control algorithm can command the block handler to pick up the block that has the longest hydration time first to be faced first. In some embodiments, a sensor can be used for hydration level detection in the tissue. For example, a hydration level of a block can be periodically measured such that once a predetermined hydration level has been reached, the block can be marked for removal for the next step. In some embodiments, the hydration time for each tissue type can be optimized appropriately know the tissue types in the blocks. For example, a block having colon tissue may have a different hydration level/time than a block having breast tissue.

At step 414, subsequent to or substantially simultaneously to step 410, the block handler 102 can move the second tissue block (block k) to the facing microtome 104. Steps 414-424 can be substantially the same as steps 402-412 performed on the first tissue block but performed on the second tissue block. In this operational mode the facing microtome would face the first tissue block, and while the first tissue block is in hydration, the facing microtome starts to face the second tissue block.

At step 432, once the first tissue block is properly hydrated, the block handler 102 can carry the first tissue block to one of the microtomes 104 for polishing and sectioning. For example, the block handler 102 can relocate the tissue block to the microtome 104 that has been designated as the polishing and sectioning microtome 104.

At step 434, the block handler 102 can place the first tissue block into the polishing and sectioning microtome 104 (e.g., in the chuck), for example, using a similar process discussed at step 406.

At step 436, with the first tissue block in place within the chuck, the polishing and sectioning microtome 104, in some embodiments, the polishing and sectioning microtome 104 can move the microtome chuck to a sensor to identify a surface of the first tissue block with the exposed tissue (e.g., the faced portion of the block). For example, a line scanning camera can be used to observe the paraffin removal from the block. When the camera detects that the tissue width is constant though out the length of the block, it is considered fully polished and planarized on the sectioning microtome blade. Since polishing and sectioning microtome 104 and facing microtome 104 are different instances of a microtome 104, due to manufacturing/assembly processes they are not identical at 4 μm scale-4 μm is the tissue section thickness. The facing cuts can be 10 to 15 μm thick and the polish cuts can be 4 to 5 μm thick.

At step 438, once the surface of the tissue block is found, the first tissue block is positioned on the cutting blade and polish cuts are taken. Polish cuts have the same thickness as the final tissue sections but are not transferred to a glass slide. The polish cuts are needed to make sure the first tissue block surface and the blade are in the substantially the same vertical plane. The polish cuts create a plane on the surface of the block such that the blade is on that plane throughout the height of the block. Once polish cuts are completed the automation device applies a tape to the first tissue block face. There is an adhesive transfer medium 106 routed from the blade holder and the polishing and sectioning microtome

104 chuck gently pushes the paraffin block face against the adhesive side of the transfer medium 106. In some embodiments, a wall behind the transfer medium 106 can support the transfer medium 106 when it is pushed against by the paraffin block and the chuck of the polishing and sectioning microtome 104. In some embodiments, there is a resistive sensor behind the transfer medium which picks up a signal when the block is pushed against the transfer medium. This tells that at least a point on the block touched the transfer medium. One can do a pressure mapping with a similar but more complicated sensor. In this case one can determine what percentage of the block face is touching the transfer medium. Once the transfer medium 106 is attached it can take a cut, and the first tissue block can be split into two different pieces, one that attached to the plastic cassette (remaining block) and the tissue section.

At step 440, the block handler 102 can remove the first tissue block from the polishing and sectioning microtome 104 via the transfer medium 106. For example, the tissue section gets stuck to the tape and transferred to another part of the automated system 100. At this point, the processing cycle for the first tissue block has completed the tandem process 400.

At step 442, subsequent to or substantially simultaneously to step 440, the block handler 102 can move the second tissue block to the polishing and sectioning microtome 104. Steps 442-450 can be substantially the same as steps 432-440 performed on the first tissue block but performed on the second tissue block.

Following the tandem process 400 of FIGS. 4A and 4B, every block would go through both of the facing microtome 104 and the polishing and sectioning microtome 104. One advantage of using multiple microtomes 104 in tandem is that other supporting subsystems would not need to be replicated. For example, the transfer medium 106 handler subsystem is a large and complicated system and in a tandem operational mode one transfer medium 106 handler would be sufficient to handle the blocks processed by two microtomes 104. Also, in the tandem operational mode, any combination of sensors can be placed on each microtome 104 that are optimized for their tasks. For example, the facing microtome could have a camera with UV lights and visible range camera or Mid-wave Infrared (MWIR) LEDs and camera while the sectioning microtome can have visible range camera and a pressure sensor. The steps in FIGS. 4A and 4B increase the performance and quality of the work output.

Figure 5A:
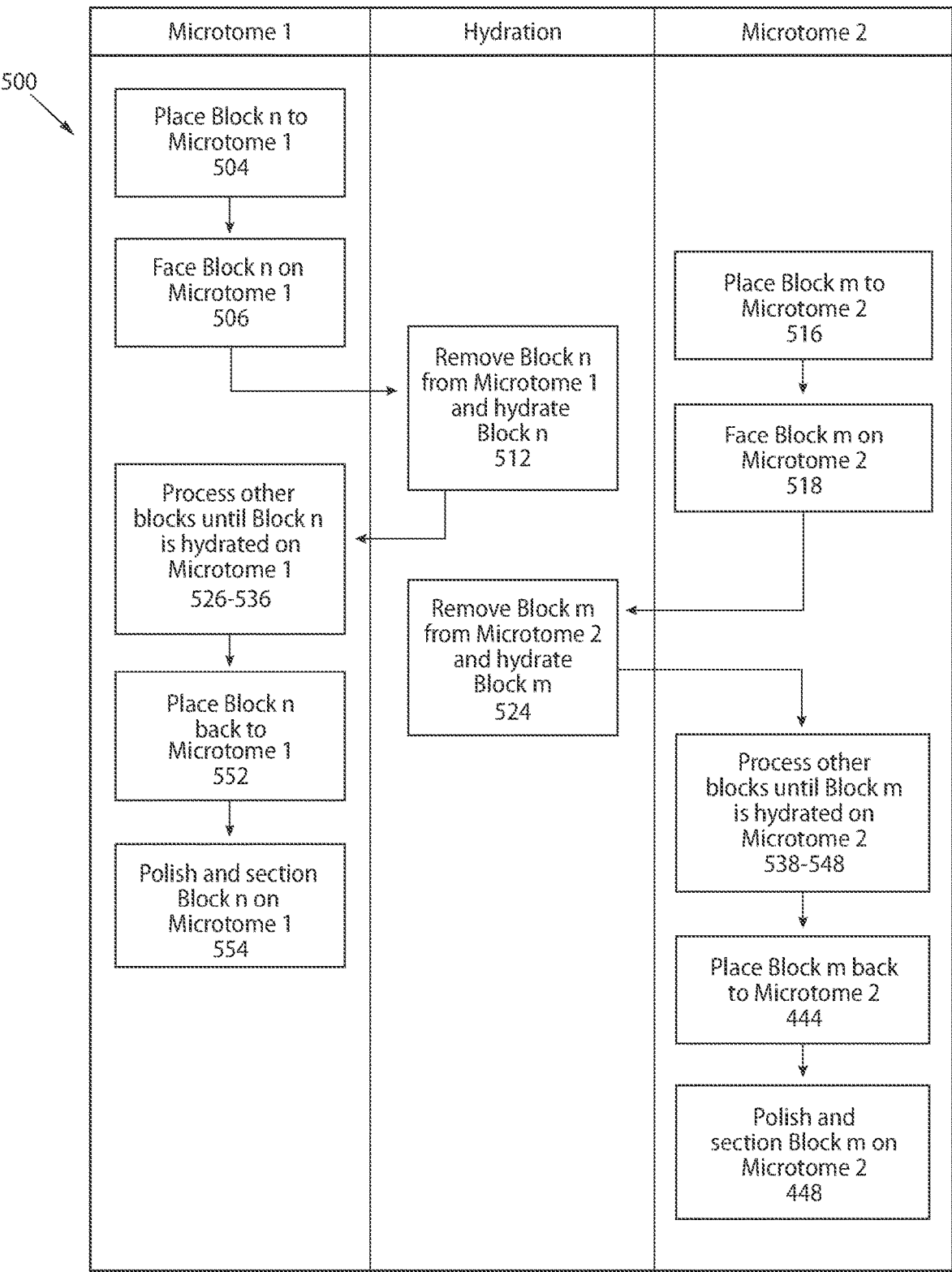
FIGS. 5A and 5B are flow charts describing the operation of multiple microtomes in parallel in accordance with some embodiments of the present disclosure.
Figure 5B:
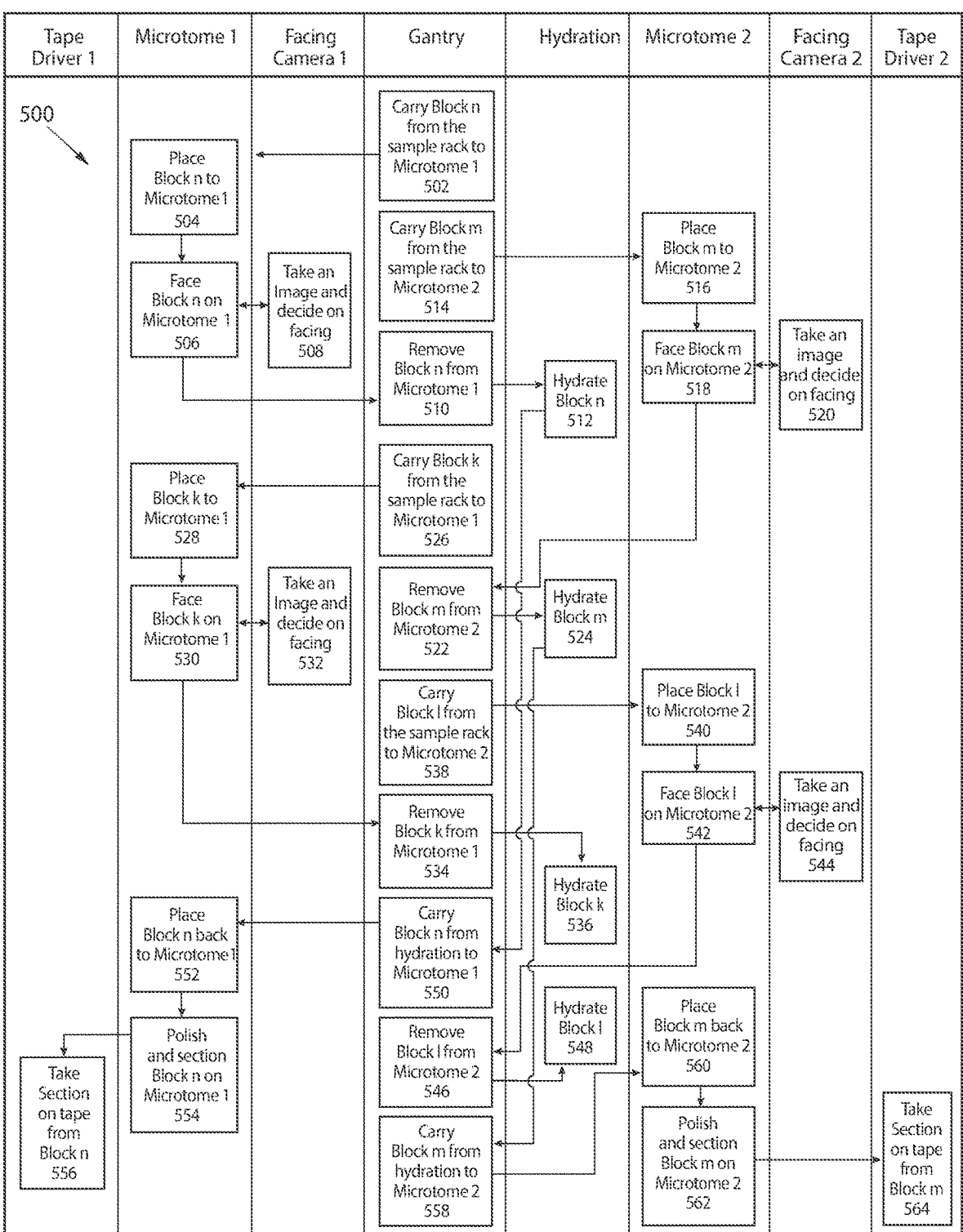

Referring to FIGS. 5A and 5B, in some embodiments, two or more microtomes 104 can be configured within the automated system 100 to work in parallel. FIGS. 5A-5B include various steps 502-564, but some of the steps are optional. Some of the steps are discussed in more detail below.

For example, the automated system 100 can be designed such that multiple microtomes 104 can operate in parallel to face, polish, section, and tape samples from blocks. In this workflow a given block is only processed by some not all of the microtomes, for example, following process 200 discussed with respect to FIG. 2. In some embodiments, as shown in FIGS. 5A and 5B, each of the microtomes 104 operating in parallel can be staged in start time such that they can share subsystems (e.g., placement mechanism, hydration chamber 108, transfer medium 106 handler, etc.). The processes 500 in FIGS. 5A and 5B can include the same steps provided in FIGS. 4A and 4B but with each microtome 104 operating in parallel performing the steps associated with each of the facing microtomes 104 and polishing and sectioning microtomes 104. For example, one or more first microtomes 104 would face a first tissue block and then the first tissue block would return to first microtome 104 after hydration for polishing and section. Substantially parallel to the processing of the first tissue block by the first microtome 104, one or more second microtomes 104 would face a second tissue block and then the second tissue block would return to second microtome 104 after hydration for polishing and section. This process 500 can reduce the time to resurface a block after hydration. In some embodiments, the microtomes 104 can be identical and the parts count between from manufacturing point of view decreases. Also, it can be flexible and receive inputs from the user to pick which internal device flow would work better for the laboratory overall workflow.

Continuing with FIGS. 5A and 5B, initially, the user can place one or more tissue blocks onto the block tray 110 to be loaded into the automated system 100. In some embodiments, the block handler 102 can have a special gripper designed to pick up the tissue blocks and move them between the various locations discussed in FIGS. 5A and 5B. For example, the block handler 102 can have a special gripper designed to move the blocks from the block tray 110, to and from the chuck of the first microtome 104, to and from the hydration chamber 108 to the sectioning microtome 104. The gripper can have finger like features that open and close, with this action the gripper hold the block and can exert enough force, for example, to safely remove the block from a chuck on the microtome 104. In some embodiments, the hydration chamber 108 can have a construction similar to the block tray 110 to hold the tissue blocks in place while allowing the block handler 102 to easily place and remove the blocks. A supervisory software can be provided to oversee the actions of the microtomes 104, the block handler 102 and the hydration chamber 108 to coordinate their actions.

Initially, in some embodiments, once the block tray 110 is in place, a barcode scanner attached to the block handler 102 can scan one or more barcodes printed on the paraffin tissue blocks in the block tray 110. In some embodiments, the block handler 102 can pick up the tissue blocks and position them in proximity to a fixed barcode scanner to be identified.

At step 502, once a tissue block(s) is identified, the block handler 102 can carry the first tissue block (block n) to one of the microtomes 104 for facing. For example, the block handler 102 can relocate the tissue block to the microtome 104 that has been designated as the first microtome 104. In some instances, the block handler 102 can take the first tissue block from the block tray 110 and move it directed to one of the microtomes 104 for facing.

In some embodiments, a supervisory algorithm can use the machine-readable codes on the blocks to manage the locations in which the block handler 102 transports and places the blocks. For example, the block handler 102 can include a scanner to read the machine-readable codes on the blocks before picking them up. This way, the supervisory algorithm can identify and track the blocks while providing instructions to the block handler 102 as to which blocks to pick up and where to place them.

At step 504, the block handler 102 can place the first tissue block into the first microtome 104 (e.g., in the chuck). In some embodiments, in preparation to receive a new block, the chuck of the first microtome 104 can move up and retracts back. Subsequent or simultaneous to the microtome 104 preparation, the block handler 102 can pick a block from the block tray 110 and bring it to the chuck of the first microtome 104 and slide it from right to the left. In some embodiments, the chuck can have a spring-loaded clamping mechanism and the block handler 102 gripper can have strong enough to overcome this clamping force. Once the block is inserted in to the chuck the block handler 102 gripper opens up its finger like features and moves slightly towards the blade holder and disengages the block. The block is now securely held by the microtome chuck.

At step 506, with the first tissue block in place within the chuck, the first microtome 104 can begin the facing process to remove the excess paraffin layer due to molding process on the tissue. In some embodiments, the microtome can move the microtome chuck to a position sensor which can be a touch sensor or a non-touch laser or sound based sensor. Each block can be made in molds that may have slightly different heights. The automated system 100 needs to know where the surface of the first tissue block is with respect to the plastic cassette. This sensor can determine the location of the surface of the block. For a touch sensor one can use a resistive sensor which changes the voltage out sensed by the controlling hardware. The change in voltage indicates the block surface touching the sensor. If the block thickness axis encoder is read at the same time, this gives the location of the block surface. For a non-touch laser implementation, a through beam laser sensor can be used. There would be an emitter and a receiver apart from each other but on the same line of sight. When advanced on the thickness axis (x-axis) the block would block this light path and once can observe the receiver side voltage reading changed. This voltage change and encoder reading on the thickness axis simultaneously indicates the location of the block surface. Regardless of type of sensors being used, the surface finding sensor can be placed at a known location with respect to the microtome blade. After surface detection the chuck can be moved to the sectioning position as close as possible to the blade in the vertical plane. For example, after a few up and down microtome cycles the surface of the first tissue block catches the blade.

At step 508, in some embodiments, a camera can be provided to capture images of the first tissue block as it is being cut. The camera can be designed to provide image data to determine when enough sections are taken, and a large cross-section of the tissue is exposed. During the facing process paraffin chips are created as a waste product. In some embodiments, these paraffin chips can be blown off by an air blade on the chuck and sucked by a vacuum on the blade holder.

At step 510, the block handler 102 can remove the first tissue block from the first microtome 104 and places the first tissue block into the hydration chamber 108. Removing the block from the first microtome 104 can be the reverse of the block placement on the chuck from step 406, but with the destination being the hydration chamber 108.

At step 512 the first tissue block hydrates within the hydration chamber 108 for a predetermined period of time. For example, the blocks can be designed to spend approximately 10 to 15 minutes in the hydration chamber 108. The supervisory control algorithm can command the block handler to pick up the block that has the longest hydration time first to be faced first. In some embodiments, a sensor can be used for hydration level detection in the tissue. For example, a hydration level of a block can be periodically measured such that once a predetermined hydration level has been reached, the block can be marked for removal for the next step. In some embodiments, the hydration time for each tissue type can be optimized appropriately to know the tissue types in the blocks. For example, a block having colon tissue may have a different hydration level/time than a block having breast tissue.

At step 514, subsequent to or substantially simultaneously to step 502, the block handler 102 can move a second tissue block (block m) to the second microtome 104. In some embodiments, the supervisory level software can keep track of where each block is faced so that it can be returned to the same microtome after hydration. Steps 514-524 can be substantially the same as steps 502-512 performed on the first tissue block by the first microtome 104 but performed on the second tissue block by the second microtome 104. In this operational mode the first microtome would first face the first tissue block, and while the first tissue block is in hydration, the first microtome starts to face the second tissue block.

At step 526, subsequent to or substantially simultaneously to step 514, the block handler 102 can move a third block (block k) to the first microtome 104. In some embodiments, the supervisory level software can keep track of where each block is faced so that it can be returned to the same microtome after hydration. Steps 526-536 can be substantially the same as steps 502-512 performed on the first tissue block by the first microtome 104 but performed on the third block by the first microtome 104. In this operational mode the first microtome would face the third tissue block while the first tissue block is in hydration.

At step 538, subsequent to or substantially simultaneously to step 526, the block handler 102 can move a fourth block (block i) to the second microtome 104. In some embodiments, the supervisory level software can keep track of where each block is faced so that it can be returned to the same microtome after hydration. Steps 538-548 can be substantially the same as steps 502-512 performed on the first tissue block by the first microtome 104 but performed on the fourth block by the second microtome 104. In this operational mode the second microtome would face the fourth tissue block while the second tissue block is in hydration.

At step 550, once the first tissue block is properly hydrated, the block handler 102 can carry the first tissue block the first microtomes 104 for polishing and sectioning. At step 552, the block handler 102 can place the first tissue block into the first microtome 104 (e.g., in the chuck). At step 554, with the first tissue block in place within the chuck, the first microtome 104, in some embodiments, the first microtome 104 can move the microtome chuck to a sensor to identify a surface of the first tissue block with the exposed tissue (e.g., the faced portion of the block). For example, a line scanning camera can be used to observe the paraffin removal from the block. When the camera detects that the tissue width is constant throughout the length of the block, it is considered fully polished and planarized on the sectioning microtome blade.

At step 556, once polish cuts are completed the automation device applies a tape to the first tissue block face. There is an adhesive transfer medium 106 routed from the blade holder and the first microtome 104 chuck gently pushes the paraffin block face against the adhesive side of the transfer medium 106. In some embodiments, a wall behind the transfer medium 106 can support the transfer medium 106 when it is pushed against by the paraffin block and the chuck of the second microtome 104. In some embodiments, there is a resistive sensor behind the transfer medium which picks up a signal when the block is pushed against the transfer medium. This tells that at least a point on the block touched the transfer medium. One can do a pressure mapping with a similar but more complicated sensor. In this case one can determine what percentage of the block face is touching the transfer medium 106. Once the transfer medium 106 is attached it can take a cut, and the first tissue block can be split into two different pieces, one that attached to the plastic cassette (remaining block) and the tissue section. The block handler 102 can also remove the first tissue block from the first microtome 104 via the transfer medium 106. For example, the tissue section gets stuck to the tape and transferred to another part of the automated system 100. At this point, the processing cycle for the first tissue block has completed the tandem process 400.

At step 558, subsequent to or substantially simultaneously to step 550, the block handler 102 can move the second tissue block to the second microtome 104. Steps 558-564 can be substantially the same as steps 550-556 performed on the first tissue block but performed on the second tissue block. Similarly, the third and fourth blocks can be polished and taped using similar processing steps. Following the parallel process 500 of FIGS. 5A and 5B, every block would go through both of the first microtome 104 and the second microtome 104. The steps in FIGS. 5A and 5B increase the performance and quality of the work output.

It should be noted that while the process above is discussed in connection with moving the tissue blocks to a hydration chamber, in some embodiments, the hydration of the tissue blocks may be implemented in place at the one or more microtomes.

Figure 6:
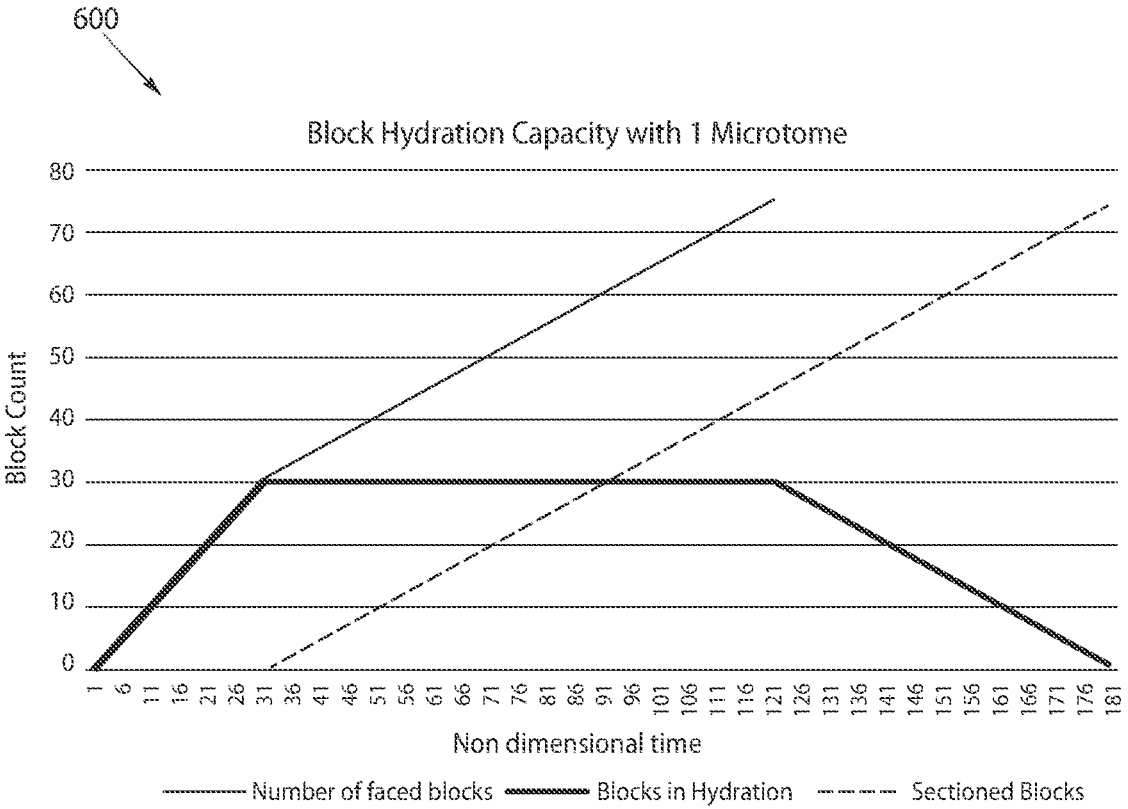
FIG. 6 is a graph illustrating block hydration capacity using a single microtome in one example of a multiple path process in accordance with some embodiments of the present disclosure.
Figure 7A:
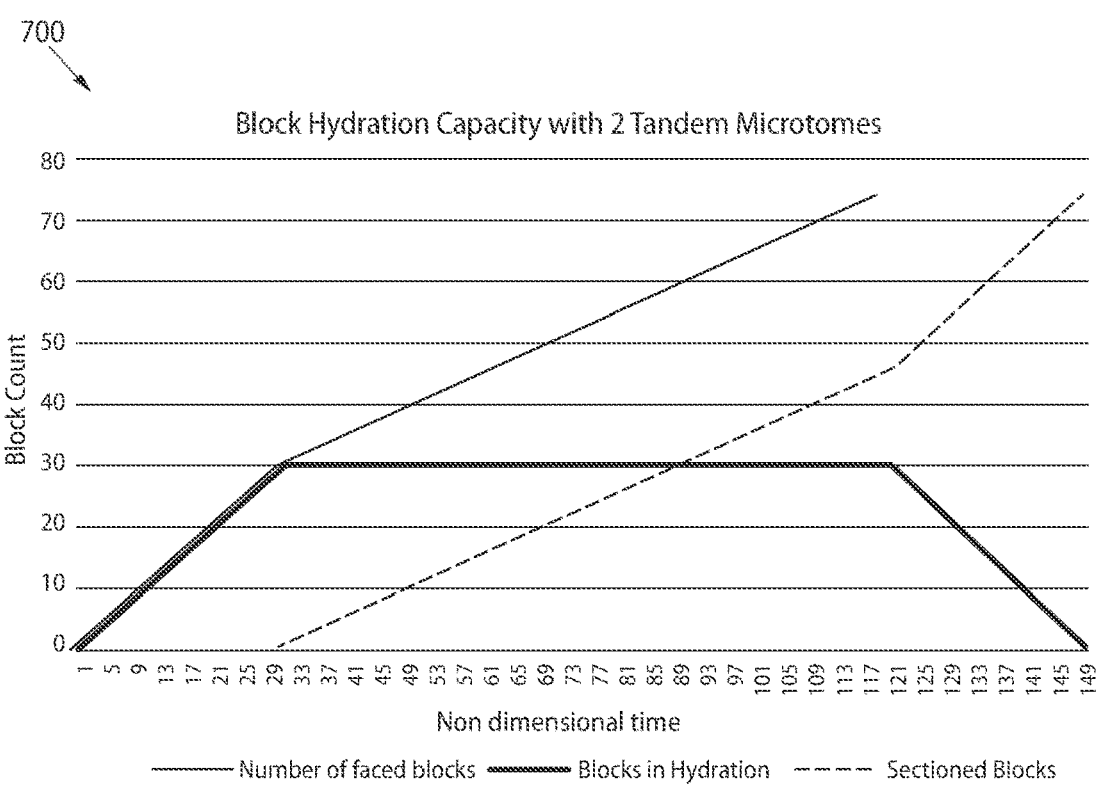
FIGS. 7A and 7B are graphs illustrating block hydration capacity using two microtomes in tandem (top graph) and parallel (bottom graph) operation order in accordance with some embodiments of the present disclosure.
Figure 7B:
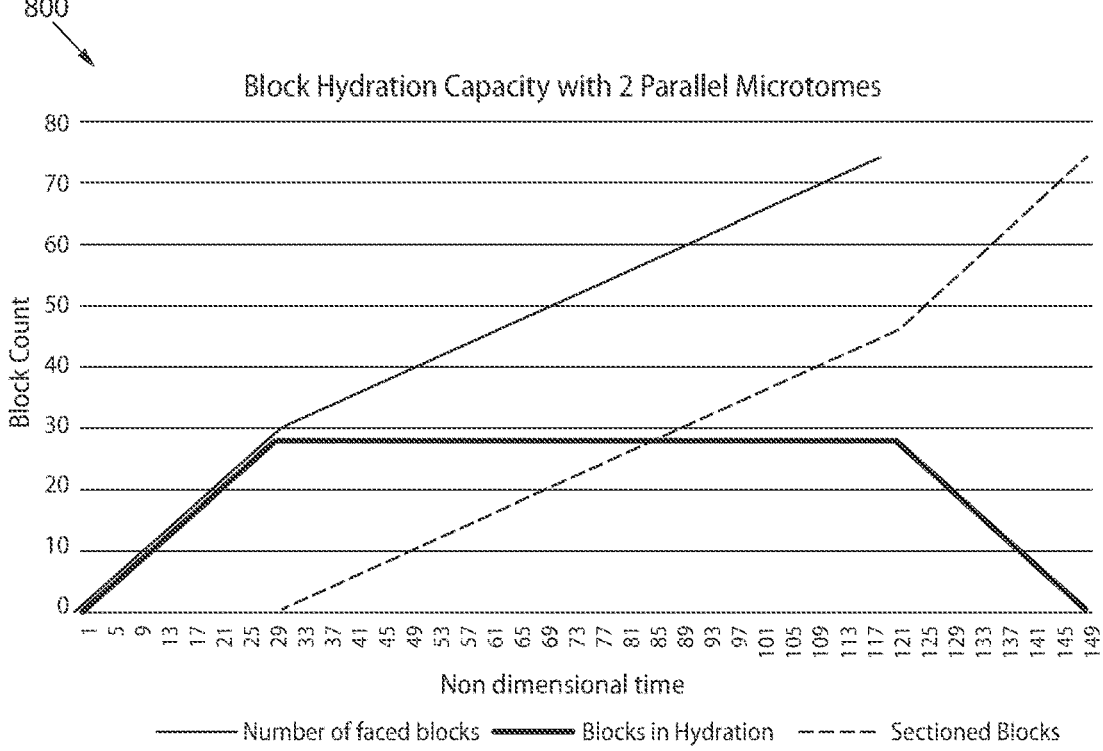

FIGS. 6, 7A, and 7B depict charts 600, 700, 800 showing comparative block hydration capacities by way of example, showing results with 75 tissue blocks over with time, with time increments assigned a numeric valve for ease of illustration. FIG. 6 illustrates block hydration capacity with a single microtome; FIGS. 7A and 7B illustrate block hydration capacity using two microtomes in accordance with the present disclosure. FIG. 7A depicts the tandem mode of operation and the bottom graph depicts the parallel mode of operation and FIG. 7B depicts the parallel mode of operation. Note 75 blocks are shown by way of example to illustrate the advantage of the additional microtome.

As the charts show, in this example, the device throughput can increase by more than 18% under certain running conditions by using a second microtome. The X-axis provides a non-dimensional time and the Y-axis the number of blocks (block count). Line A (dotted line) designates the number of faced blocks, line B (dashed line) designates the number of blocks in hydration and line C (dash dotted line) designates the number of blocks sectioned. As can be seen, for a period of time, the blocks are faced and placed in the mixture or chamber for the hydration phase. After the first tissue block is hydrated, sectioning can commence with the second microtome while the first microtome continues to face the blocks. As the blocks continue to be removed from the hydration phase (decline of hydration line until all blocks are faced) and the blocks continue to be sectioned until compete, the time unit in FIGS. 7A and 7B are at 146 while the time unit in FIG. 6 is at 176. Also note that the slopes of the lines in FIGS. 7A and 7B are constant while the lines in FIG. 6 are zig-zag, illustrating the average speed is slower in FIG. 6. Comparison of FIG. 6 and FIGS. 7A and 7B show the increased throughput with the two microtomes in accordance with one example of a multiple path process of the present disclosure.

It should be appreciated that the graphs of FIGS. 6, 7A, and 7B are provided to show an example of the advantage of using multiple microtomes, and it should be appreciated that other block counts and other time periods are also contemplated. Additionally, if more than two microtomes are used in the automated system, than the throughput would increase by an even greater amount than depicted in FIGS. 7A and 7B. Therefore, it should be appreciated that in some embodiments where more than two microtomes are utilized in the system for block facing and/or tissue sectioning, the processing speed is increased. In some embodiments with multiple microtomes, a combination of the parallel method, tandem method, serial method or even batch method can be used.

To further increase throughput by an automated apparatus for tissue sectioning, the present disclosure further provides an improved hydration method. In some embodiments, the presently disclosed methods enhance the rate of hydration by overcoming certain fundamental aspects of the wax medium, notably, its hydrophobicity, as manifested by its high contact angle to hydrating liquid. For example, the instant methods can employ surfactants to lower the contact angle of hydrating liquid at a hydrophobic surface. Additionally, surfactants may also allow hydrating liquid to diffuse into biological tissue matter at a much faster rate. It's also quite desirable to further facilitate capillary entrainment of hydrating liquid into paraffin micropores, per se, separate and apart from the more hydrophilic biological tissue matter, e.g., carbohydrates, protein, and lipids. In some embodiments, the present disclosure provides methods that either supply or transport hydrating liquid, used alone, or else, in conjunction with the aforementioned enabling surfactant, such that the efficiency of hydration is further improved.

In some embodiments, hydrating liquid vapor can be applied on the tissue block within a hydration chamber, such that hydrating liquid droplets condense on the blockface (exposed face of the tissue sample). In some embodiments, a directed flow of moisture to the blockface is applied. In some embodiments, a directed flow of hydrating liquid drops to the blockface can be applied through spraying application, such as by a sprayer. In some embodiments, the presently disclosed method allows for the hydration of single or multiple blocks to occur, either alone or within a dedicated hydration chamber that may further avail the use of some additional class of surfactants, to be used in conjunction with hydrating liquid, in any form.

Typically, as noted above, the tissue samples are provided as tissue blocks or sample blocks with tissue embedded in a preservation material such as paraffin. Next, the tissue block is faced by removing the layer of the preservation material in which the tissue is embedded to expose a large cross section of tissue, wherein such exposed section of the tissue sample is referred to as blockface. Once the tissue block is faced, the tissue sample of the tissue block can be hydrated. In some embodiments of the present disclosure, higher throughput is achieved by the novel methods and systems for accelerated tissue/wax hydration. For example, facing a block typically takes less than a minute, but hydrating and cooling takes up to 30 minutes. According to current pathology lab practice, unless the block is hydrated and cooled properly it cannot be placed on a glass slide. Accordingly, by accelerating the hydration step, the overall process of tissue sampling can be significantly expedited.

In some aspects of the disclosure, the tissue blocks are hydrated by condensing hydrating liquid drops on the blockface in order to facilitate sectioning at the microtome. Other chemical additives, separate and apart from pure hydrating liquid, either embodied within the condensing drops or otherwise applied at the blockface in a prior step, may also be used. In some embodiments, such chemical agents can include, without limitation, an oil-soluble surfactant, applied directly at the blockface, in order to induce rapid hydrating liquid penetration into the wax, deriving from emulsification of rapidly condensing hydrating liquid drops from very air saturated with hydrating liquid vapor (such air is also referred to interchangeably as humid air, but it should be noted that hydrating liquid other than water can be used). In some embodiments, such chemical agents may be soluble in hydrating liquid and may thereby enhance spreading and penetration of liquid drops. The liquid drops can be applied as a spray onto the blockface, for example, or by direct droplet condensation of the (dilute) surfactant solution within the humidified chamber.

According to some aspects of the present disclosure, tissue blocks are placed in a sealed hydration chamber for a prescribed time, wherein droplet condensation upon the blockface enables very fast hydration to occur. In some embodiments, droplet condensation occurs under very controlled conditions in a dedicated hydration chamber, thus allowing for batch processing of many tissue blocks, simultaneously.

According to some aspects of the present disclosure, a hydration chamber generates condensed hydrating liquid droplets onto a cold blockface, wherein the warmer temperature of the condensing hydrating liquid drops not only enhances the kinetic energy of the impinging droplets, but also, the resulting heat of condensation softens the wax in very close proximity to the air/tissue interface. In this manner, the hydrating liquid entrainment is kinetically accelerated, effectively reducing the tissue hydration time, and therefore, improving device productivity of the automated tissue sectioning apparatus.

According to some aspects of the present disclosure, the hydration method can also include directing a stream of moisture at the blockface (e.g., using an ultrasonicator), and may also include the application of hydrating liquid drops at the blockface. The directed spray of hydrating liquid in either the vapor phase as moisture or the liquid phase, as condensed phase hydrating liquid drops, can be variously derived or generated forms of hydrating liquid that serve to hydrate an individual blockface, or a multitude of tissue blocks. In some embodiments, in such a process, a separate hydration unit may not be required, but the humidification or spray may instead be achieved at the microtome. In some embodiments, this may be achieved by a dispersed spray of hydrating liquid droplets, or alternatively, a directed or focused spray of moisture, that may subsequently condense on a cold blockface, maintained below the dew point of hydrating liquid vapor.

According to some aspects of the present disclosure, a chemical additive can be applied to the blockface, wherein the additive further promotes or accelerates the process of aqueous diffusion into the tissue/wax composite medium. The blockface may then be subject to any form of humidification, directed hydrating liquid droplet spray, focused channeling of moisture (hydrating liquid vapor), or any other method that may serve as a source of hydrating liquid, in a form that includes both the liquid phase (hydrating liquid drops), or the vapor phase (moisture susceptible to condensation on a cold blockface). Consistent with the particular (thermodynamic) activity of the chemical additive, aqueous diffusion can thereby be accelerated, wherein the enhanced rate of tissue hydration may derive from any number of mechanisms, that involve various physical or chemical forces, such as, by way of a non-limiting example, surface tension, spreading, and wetting, that allow hydrating liquid to overcome transport resistance associated with wax's hydrophobic character, i.e., high contact angle for hydrating liquid.

According to some aspects of the present disclosure, an oil-soluble surfactant, applied directly at the blockface, induces very rapid hydrating liquid penetration into the wax, deriving from emulsification of rapidly condensing hydrating liquid drops from humid air. In this hydrating liquid/oil (W/O) emulsification process, humid air is maintained, such that hydrating liquid drops condense onto the surfactant-coated and very cold blockface, wherein hydration of the paraffin-infused tissue occurs, deriving from the thermodynamic driving force for condensed hydrating liquid vapor drops to be (instantly) emulsified at the surfactant-stabilized wax surface.

According to some aspects of the present disclosure, the hydration method also includes directing a stream of moisture at the blockface (e.g., using an ultrasonicator), in which the surfactant additive has been previously applied. Then, a directed spray of hydrating liquid, constituted in either the vapor phase as moisture, or the liquid phase as a spray of hydrating liquid drops, is used to hydrate the tissue blocks. Such process may not necessarily require a separate humidification unit, but may be carried out directly at the microtome.

According to some aspects of the present disclosure, a superspreading aqueous surfactant solution is directly sprayed onto the blockface or is otherwise condensed as liquid microdrops from within a hydration chamber onto the blockface prior to sectioning at the microtome. The deposited or condensed aqueous solution spreads very rapidly over the tissue/wax surface, simultaneously, enabling very rapid penetration of hydrating liquid into the tissue, exposed at the blockface, therein.

Once hydration is complete, the block is then sectioned and transferred to adhesive tape for further processing downstream.

Figure 8:
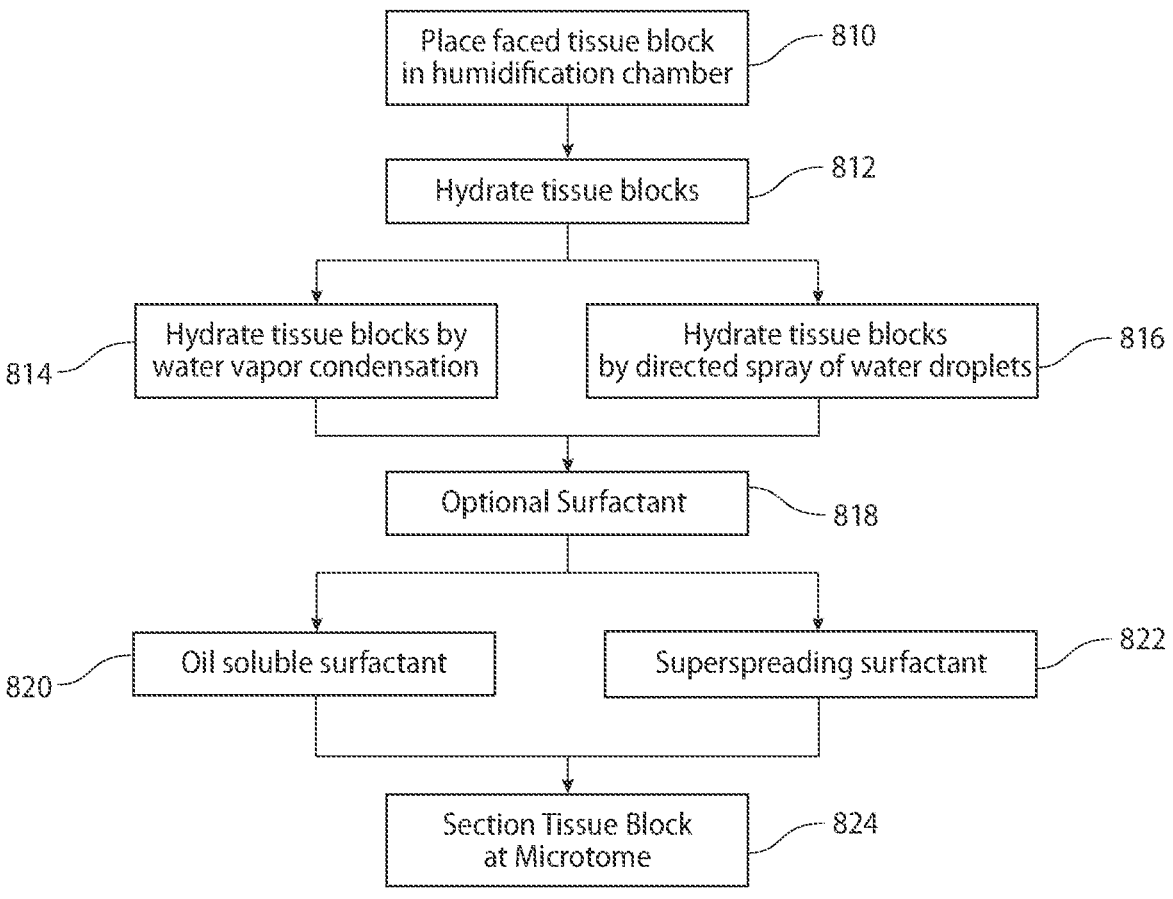
FIG. 8 is a flow chart showing an exemplary hydration process of the present disclosure.
Figure 9:
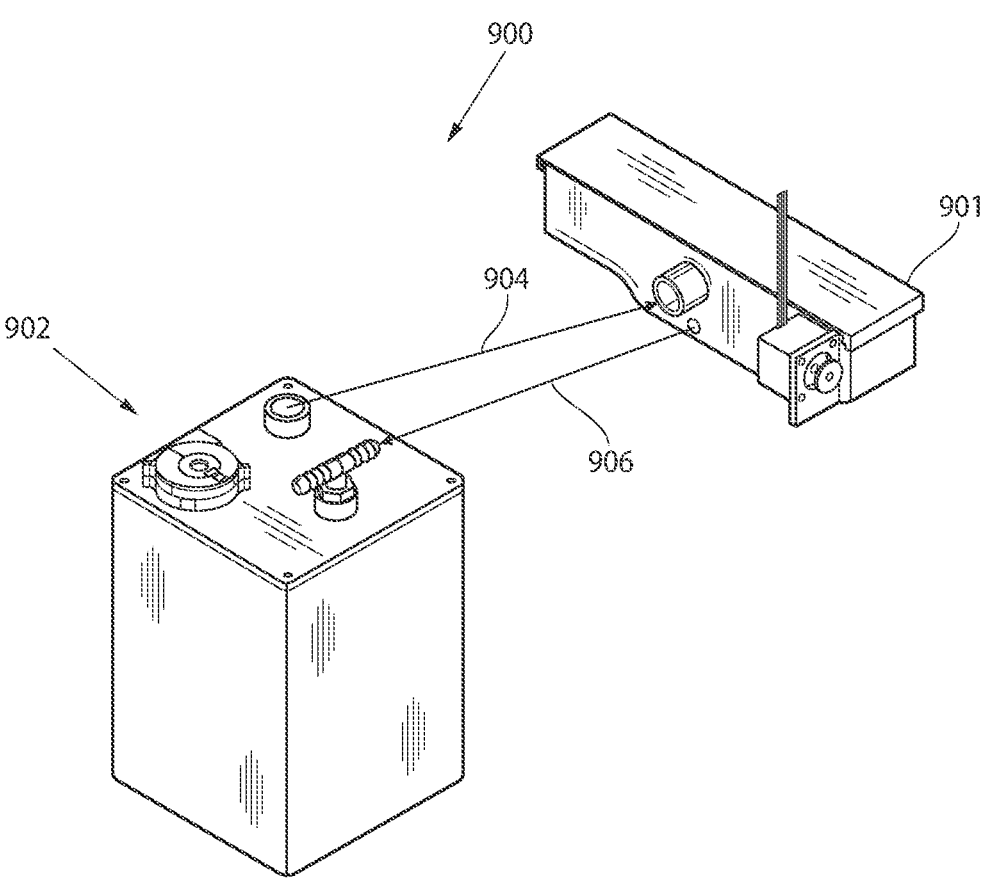
FIGS. 9-11 illustrate exemplary components for batch processing of tissue blocks according to the present disclosure.

In reference to FIG. 8, exemplary methods for the enhanced hydration process are described. In general, the exemplary methods include one or more of steps 810-824. In some embodiments, in step 810, the faced tissue block is placed into a humidification chamber. In step 812, the tissue block can be hydrated, which in some embodiments, in step 814, involve hydrating the tissue blocks by hydrating liquid vapor condensation. In some embodiments, in step 816, alternatively or additionally, the tissue blocks are hydrated by directed spray of hydrating liquid droplets. In step 818, an optional surfactant is used. In some embodiments, in step 820, an oil based surfactant is used. In some embodiments, in step 822, alternatively or additionally, a superspreading surfactant can be used. In step 824, the tissue block is sectioned at a microtome. hydration chamber In some embodiments, in step 814, tissue blocks can be placed in the hydration chamber for a prescribed time, wherein droplet condensation upon the faced blocks enables very fast hydration to occur. In some embodiments, the tissue block can be hydrated using rapidly condensing hydrating liquid droplets applied onto the blockface. In some embodiments, this may be achieved using an ultrasonicator. In some embodiments, a humid air can be maintained in the hydration chamber such that hydrating liquid drops condense onto the surfactant-coated and very cold blockface (~4° C.). In some embodiments, the blockface is maintained at about 10-12° C. In some embodiments, the humid air is at about room temperature. In some embodiments, the humid air is about above room temperature. In some embodiments, the humid air is about below room temperature.

In some embodiments of the present disclosure, as discussed above, the tissue blocks are cooled, maintaining the temperature at the blockface to about less than 12° C. In some embodiments of the present disclosure, the tissue blocks are cooled to less than 10° C. at the microtome. Various embodiments of the cooling methods and systems are disclosed above.

In some embodiments, in step 816, the hydration method includes spraying the blockface with hydrating liquid to deposit liquid hydrating liquid drops on the surface of the blockface. In some embodiments, a mechanical or pneumatic pump using a fogger nozzle at temperatures below about 10° C. may be employed to spray the sample block. In some embodiments, the amount sprayed is sufficient to cover the blockface with surface hydrating liquid, generally at about room temperature, over about a few seconds. While spraying is premised on a dedicated chamber that can contain many blocks, it may not, necessarily, be outfitted as a hydration chamber, at least for liquid hydrating liquid spraying. Conversely, some directed source of moisture may derive from an external source, i.e., a sonicator, or else, be embodied in a hydration chamber, using a more focused or purposely directed spray of moisture onto the blockfaces, internal to the hydration chamber.

In some embodiments, a chemical additive can be applied to the blockface to further promote or accelerate the process of aqueous diffusion into the tissue/wax composite medium. The blockface may then be subject to any form of humidification, directed hydrating liquid droplet spray, focused channeling of moisture (hydrating liquid vapor), or any other exemplary mechanical method that may serve as a source of hydrating liquid in a form that includes both the liquid phase (hydrating liquid drops), or the vapor phase (moisture susceptible to condensation on a cold blockface). Consistent with the particular (thermodynamic) activity of the chemical additive, aqueous diffusion is thereby accelerated, wherein the enhanced rate of tissue hydration may derive from any number of mechanisms, that involve various physical or chemical forces, such as surface tension, spreading, and wetting, that allow hydrating liquid to overcome transport resistance associated with wax's hydrophobic character, i.e., high contact angle for hydrating liquid.

In some embodiments, in step 818, an optional surfactant may be used. In step 820, an oil soluble surfactant may be applied on the blockface (e.g., brushing, spraying) within the hydration chamber such that a hydrating liquid-oil emulsion is formed on the blockface when moisture is applied to the blockface. The surfactant can be applied directly on the blockface, in order to induce hydrating liquid penetration into the tissue/wax composite medium, deriving from interfacial W/O emulsification of rapidly condensing hydrating liquid drops from humid air (for example, at room temperature) upon an extremely cold blockface, maintained below the dew point of the condensing vapor phase. In some embodiments, operationally, the blocks are cooled in the hydration chamber, by any number of exemplary means, including, without limitation, the use of ice, piezoelectric cold plates, dry ice, liquid nitrogen, etc. In some embodiments, a cooling system as described above is used. In this manner, there is the stabilization of the condensing droplets to coalescence, such that the hydrating liquid droplets retain their dispersed phase integrity, i.e., they remain as dispersed hydrating liquid droplets, upon merging with the continuous phase, defined by the tissue/wax composite. Not wishing to be bound by theory, the mechanism is consistent with surfactants that may be, generally, more oil-soluble, enabling the surfactant to more naturally form a homogeneous mixture with paraffin wax, specifically, at the air/blockface interface, insofar as a few tens of microns may be required, in order to realize the sectioning of a few four micron slivers or tissue specimens, per (hydrated) tissue block. Various oil-soluble surfactants can be used including, without limitation, sorbitan ester, glycerol stearate, Polyethylene Glycol Oleyl Ether; Sorbitan Monooleate; and Sorbitan Tristearate, or more generally, any oil-soluble surfactant that has an appropriately low HLB value, as commonly defined, or generally understood to indicate surfactant solubility in oil-like or hydrophobic media vs. that of hydrophilic media (e.g., less than about 8 HLB). In some embodiments, the concentration of surfactant is about 1 mM.

In some embodiments, the oil-soluble surfactant may be further dissolved in any oil-like substance, such as paraffin oil or wax. This binary, low viscosity mixture may be applied to the exposed tissue of the blockface, pressing in the surfactant-entrained oil, such that the mixture infiltrates the tissue/wax medium, permeating the embedded wax, such that the mixture disappears or diffuses into the wax at the exposed tissue/wax surface. In some embodiments, the surfactant is immersed within the wax. Paraffin oil, which conforms to the low MW end of the MW distribution for paraffin wax, is ideally compatible with the higher MW wax, and therefore, it simply serves to transport the surfactant, if even to a depth of only 50 microns. In some embodiments, a portion (for example, 10%) of the W/O surfactant is mixed with pure paraffin oil and applied to the blockface, in order to entrain the W/O surfactant into the wax. In some embodiments, the surfactant may be entrained about 20 microns into the wax. Furthermore, the hydrating liquid vapor transmission rate might be two orders of magnitude higher in liquid paraffin, thus facilitating the flux of hydrating liquid across the interfacial boundary.

In some embodiments, accelerated hydration of the tissue involves the use of one or more chemical agents, soluble in hydrating liquid, that may thereby enhance spreading and penetration of the aqueous solution, either liquid drops, in the form of a spray onto the blockface, for example, or by droplet condensation from a humidified chamber. These wetting agents can be selected to lower the surface tension of hydrating liquid to ~20-22 mN/m at very low use levels (for example, less than about 2%), thereby causing the aqueous solution to rapidly spread on the hydrophobic wax/tissue surface, exhibiting a phenomenon called superspreading. In some embodiments, the surfactants are selected to result in spreading exponents at about greater than 0.5.

In some embodiments, even as the embedded tissue has higher propensity to absorb hydrating liquid, compared to pure wax, the microchannels embodied within the (quenched) crystallized wax itself, which are typically precluded from being penetrated by hydrating liquid, because of the high surface energy, are now more likely to experience hydrating liquid entrainment.

In step 822, various superspreading surfactants can be used. In some embodiments, such surfactants can include, but are not limited to Trisiloxane surfactants, that can be composed of siloxane chemical groups and a hydrophilic alkyl ether tail, which may vary in length or composition.

Siloxane structures may vary, in one form or another. For example, changing the methyl end group to a hydroxyl may induce ballistic penetration of hydrating liquid into the tissue, and any and all ethoxylated siloxane surfactants are incorporated, herein, by reference, as representative chemical agents, soluble at very low use levels in hydrating liquid, that enable the aqueous mixture to exhibit the property of superspreading, or more generally, enhanced penetration into the wax/tissue medium that is utilized in histology for the preparation and fixation of biological tissues, obtained as biopsies, for example, for use in histopathological analyses of tissue samples, encountered in medical diagnostics.

The superspreader surfactant can be selected from among any of the known and conventional superspreader surfactants, e.g., the organosilicon superspreader surfactants disclosed in U.S. Pat. Nos. 7,507,775; 7,645,720; 7,652,072; 7,700,797; 7,879,916; and 7,935,842, and in U.S. Patent Application Publication 2007/0131611, the entire contents of which are incorporated by reference herein, and the non-organosilicon superspreader surfactants, e.g., those disclosed in U.S. Pat. Nos. 5,821,195; 6,130,186; 6,475,953; 7,723,265; and 7,964,552, the entire contents of which are also incorporated by reference herein.

In some embodiments, a mixture of organosilicon superspreader surfactant(s) and non-organo silicon superspreader surfactant(s) can be employed, as disclosed in aforementioned U.S. Pat. No. 7,964,552, as optional components. Additional combinations of surfactants that may advantageously be included in the compositions of the instant disclosure include organosilicon superspreader surfactant and non-superspreading organosilicon surfactant; organosilicon superspreader surfactant and non-superspreading, non-organosilicon surfactant; non-organo silicon superspreader surfactant and non-superspreading organosilicon surfactant; non-organosilicon superspreader surfactant and non-superspreading, non-organosilicon surfactant; and, non-superspreading organosilicon surfactant and non-superspreading, non-organosilicon surfactant. The weight ratios of the different types of surfactants in these mixtures can vary widely, e.g., from 1:100 to 100:1, preferably from 1:50 to 50:1 and more preferably from 1:20 to 20:1.

The organosilicon superspreader surfactant can be selected from any one or more of the known and conventional tri- and tetrasiloxane alkoxylate types. Non-limiting examples of suitable surfactants are disclosed, for example, in U.S. Pat. No. 9,034,960, hereby incorporated by reference in its entirety. A number of polysiloxane alkoxylates (I) are commercially available such as Silwet L-77 and Silwet 408, from Momentive Performance Materials Inc.

The very low equilibrium surface tension of trisiloxane solutions is not the only reason for the superspreading behavior: the characteristic wetting properties of the trisiloxane surfactants are superior, in part, because of better adsorption on hydrocarbon solid substrates, and therefore, the solid/liquid interfacial tension is lower. Superspreading behavior can be initiated at the critical wetting concentration (CWC), which can be much higher than the critical aggregation concentration (CAC), and this behavior is indicative of dynamic surface tension effects, underlying the mechanism of superspreading. Note that the CWC does not depend on the substrate used for spreading. In some embodiments, the concentration of surfactant is about less than 2% by weight.

Surfactant adsorption at the air/liquid vs. the solid/liquid interface may be very different, in terms of the affinity of the surfactant for the surface because the chemical composition of each interface is uniquely different. In some embodiments, a single surfactant can be used. In some embodiments, instead of a binary mixtures of a single surfactant in hydrating liquid, any combination of surfactants may be used, wherein each surfactant may be categorically different, in terms of chemical structure, or some other defining feature. In this manner, synergistic effects may be achieved, providing better wetting properties.

Superspreading behavior generally correlates with lower surface tension, but that is not the only factor that affects overall performance. Size and structure of the actual surfactant molecule can also play key roles in spreading performance. Trisiloxane copolymers belong to a particular class, according to the specific chemical structure of the surfactant molecule. Trisiloxane surfactants are block copolymers of silicone, ethyleneoxide (EO) and/or propyleneoxide (PO). Typically, they either have a pendant graft structure or a linear (ABA)-structure. The specific composition depends on the respective magnitude of the variables x, y, m and n.

A molecule with significant silicone content will exhibit lubricity, release, a low coefficient of friction, slip, and mar resistance in various industrial or personal care applications. A molecule with high polyethyleneoxide content will be self-dispersible or soluble in hydrating liquid or polar solvents. It reduces the interfacial tension and thus aids wetting, spreading, and penetration. A material of high polypropyleneoxide content will be self-dispersible or soluble in nonpolar solvents. It reduces the interfacial tension of such solvents and thus aids in wetting and flow.

In some embodiments, the superspreading trisiloxanes having a pendent graft structure can be used, either alone or in combination with other surfactants.

In some embodiments, a composition is provided comprising a formulation comprising one or more surfactants as is described in U.S. Pat. No. 8,734,821, herein incorporated by reference in its entirety. The distinction in the adsorption kinetics at the air/liquid vs. solid/liquid interface or, moreover, the dynamic adsorption of surfactant molecules in front of the three-phase contact line at the solid/air interface influences and facilitates the wetting process. Surfactant redistribution in mixed systems affects the rate of spreading, and therefore, equilibrium values of surface and interfacial tension, in addition to dynamic surface tension phenomena, play a role in superspreading, and therefore, the rate of aqueous penetration into hydrophobic media, such as the wax/tissue composites, used in histological analysis of biological tissue specimens that derive from surgical biopsies of both normal and diseased tissue, in order to conduct medical diagnostics on the origin or disposition of disease by pathologists and other medical professionals. In some embodiments, the dynamic surface tension is about less than 22 dynes/cm.

In some embodiments, the processing of the tissue blocks in the automated apparatus is improved by providing therein, a spray process, wherein, the superspreading mixture is applied, directly, at the blockface in order to accelerate the transition from facing to hydration, improving, therefore, not only the speed of processing, but also, simplifying the overall mechanical design of the apparatus, insofar as the number of moving parts or the number of distinct or discrete mechanical steps is greatly minimized.

FIGS. 9-12 present non-limiting examples of suitable hydration systems. In reference to FIG. 9, a hydration system 900 may include a hydration chamber 901 in communication with a humidifier 902. The humidifier 902 is in fluid communication with the hydration chamber 901 to supply humid air 904 to the hydration chamber. The condensate 906 can be vented out of the hydration chamber 901.

Figure 10:
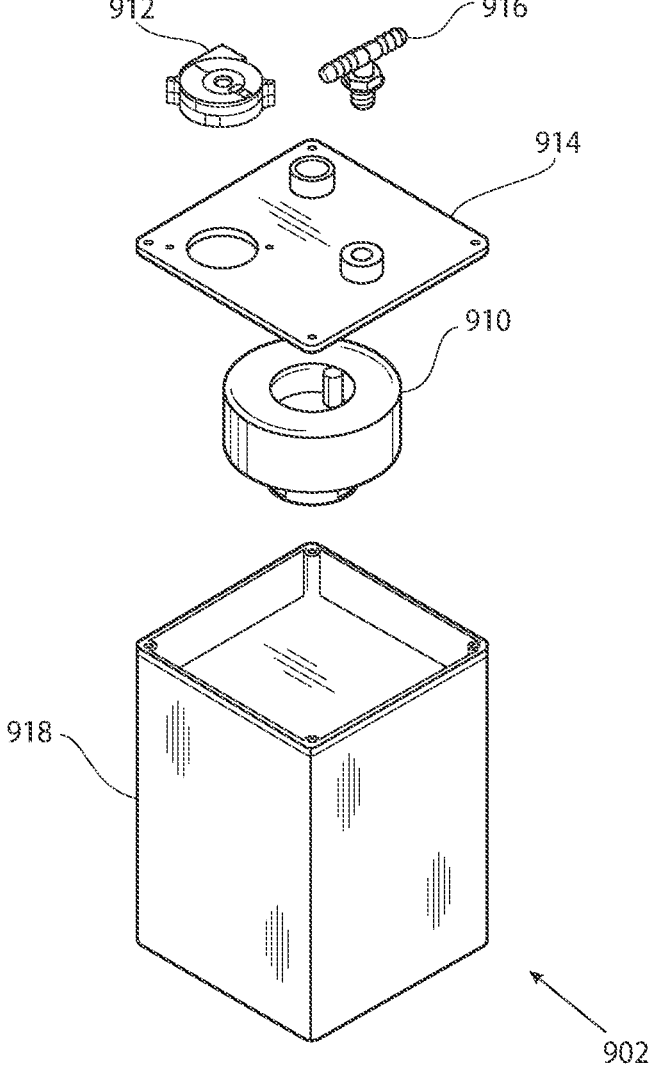

In reference to FIG. 10, in some embodiments, the humidifier 902 can include a basin 918 for storing the hydrating liquid and a lid 914. In some embodiments, the humidifier 902 can be an ultrasonic humidifier to provide an air with high humidity to the hydration chamber 901 by an ultrasonic disk 910 and a blower 912. The condensate can be returned to the humidifier via a condensate port 916.

Figure 11:
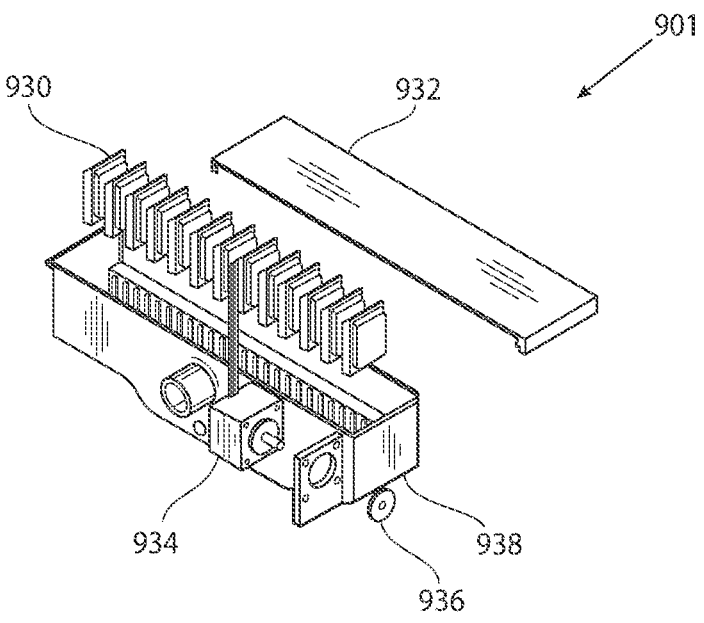

In reference to FIG. 11, the hydration chamber 901 includes a housing 938 designed to receive one or more tissue blocks 930. The humid air 904 can condense on the face of the tissue blocks 930, as discussed above. The unabsorbed condensation can be returned to the humidifier 902 through additional tubing. In some embodiments, the hydration chamber 900 can include a retractable lid 932, which can allow for removal of the tissue blocks 930 from the hydration chamber and/or to regulate the humidity in the hydration chamber. In some embodiments, a sealing motor 934 can be provided to seal the hydration chamber while the tissue blocks are being hydrated. In some embodiments, the hydration chamber 901 can also include a drive gear 936 to move the tissue blocks through the hydration chamber. Because the interior of the hydration chamber 901 is initially dry, the overflow condensation can be collected and re-used.

Figure 12:
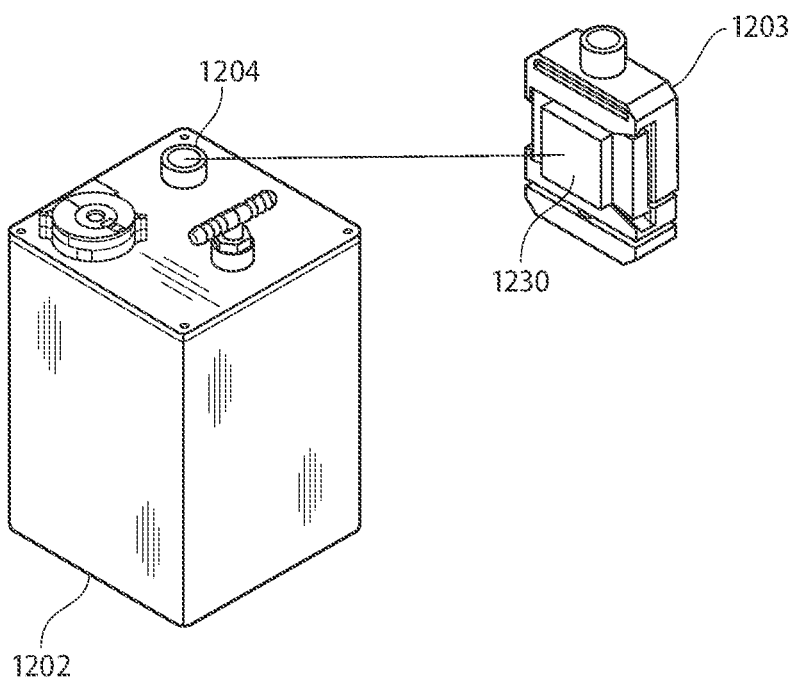
FIG. 12 illustrates exemplary components for hydrating individual tissue blocks according to the present disclosure.

In reference to FIG. 12, in some embodiments, the tissue blocks can be hydrated at the one or more microtomes. In such embodiments, the system may include a humidifier 1202, for example, similar to the humidifier 902. The humidifier can be positioned in proximity to the microtome chuck 1203 to provide the hydrating liquid, using a hose or a nozzle 1204, directly onto the blockface of the tissue block 1230 positioned in the microtome chuck 1203. The unabsorbed condensation can be discarded.

Figure 13:
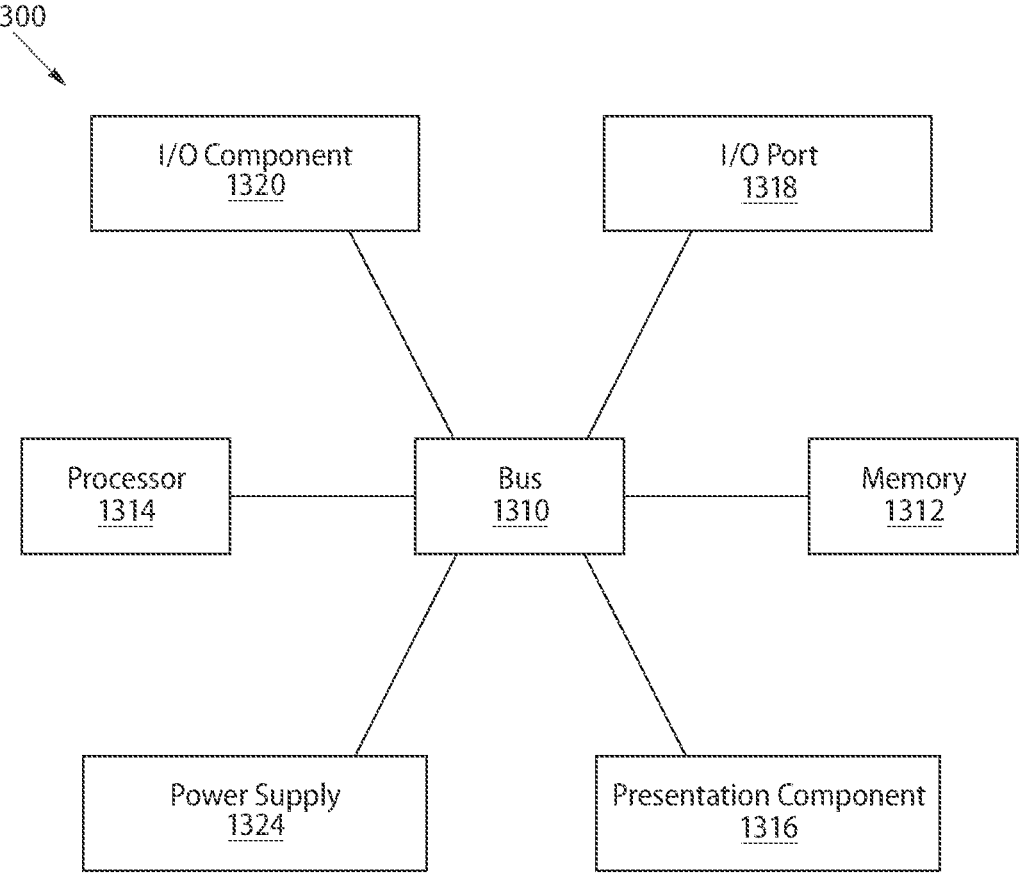
FIG. 13 is an exemplary high-level architecture for implementing processes in accordance with the present disclosure.

Any suitable computing device can be used to implement the computing devices and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1300 is depicted in FIG. 13. The computing device 1300 is merely an illustrative example of a suitable computing environment and in no way limits the scope of the present disclosure. A "computing device," as represented by FIG. 13, can include a "workstation," a "server," a "laptop," a "desktop," a "hand-held device," a "mobile device," a "tablet computer," or other computing devices, as would be understood by those of skill in the art. Given that the computing device 1300 is depicted for illustrative purposes, embodiments of the present disclosure may utilize any number of computing devices 1300 in any number of different ways to implement a single embodiment of the present disclosure. Accordingly, embodiments of the present disclosure are not limited to a single computing device 1300, as would be appreciated by one with skill in the art, nor are they limited to a single type of implementation or configuration of the example computing device 1300.

The computing device 1300 can include a bus 1310 that can be coupled to one or more of the following illustrative components, directly or indirectly: a memory 1312, one or more processors 1314, one or more presentation components 1316, input/output ports 1318, input/output components 1320, and a power supply 1324. One of skill in the art will appreciate that the bus 1310 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 13 is merely illustrative of an exemplary computing device that can be used to implement one or more embodiments of the present disclosure, and in no way limits the disclosure.

The computing device 1300 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1300.

The memory 1312 can include computer-storage media in the form of volatile and/or nonvolatile memory. The memory 1312 may be removable, non-removable, or any combination thereof. Exemplary hardware devices are devices such as hard drives, solid-state memory, optical-disc drives, and the like. The computing device 1300 can include one or more processors that read data from components such as the memory 1312, the various I/O components 1316, etc. Presentation component(s) 1316 present data indications to a user or other device. Exemplary presentation components include a display device, speaker, printing component, vibrating component, etc.

The I/O ports 1318 can enable the computing device 1300 to be logically coupled to other devices, such as I/O components 1320. Some of the I/O components 1320 can be built into the computing device 1300. Examples of such I/O components 1320 include a microphone, joystick, recording device, game pad, satellite dish, scanner, printer, wireless device, networking device, and the like.

Examples, which are set forth to aid in the understanding of the disclosure, should not be construed to limit in any way the scope of the disclosure as defined in the claims which follow thereafter. The following examples are put forth so as to provide those of ordinary skill in the art with a complete disclosure and description of how to make and use the embodiments of the present disclosure, and are not intended to limit the scope of the instant disclosure nor are they intended to represent that the experiments below are all or the only experiments performed. Efforts have been made to ensure accuracy with respect to numbers used (e.g. amounts, temperature, etc.), but some experimental errors and deviations should be accounted for.

EXAMPLES

The trisiloxane surfactants employed in this example are Silwet L-77 and Silwet 408 (see, for example, U.S. Pat. No. 8,734,821, incorporated herein by reference in its entirety). The formulations employed in this example were prepared in accordance with the following procedures: The trisiloxane surfactant or surfactants, Silwet L-77 and/or Silwet 408 are added to pure water at 0.5% by weight. The aqueous mixture is easily blended. At this point, other ingredients, such as solvents or additional surfactants may be included in the formulation. In Table 1 below, a composition of the formulation is presented, including the indicated trisiloxane surfactant at equal concentrations with no other ingredients incorporated into the compositions.

30

TABLE 1

| Formulations | | | |
|---|---|---|---|
| Surfactant | A | B | C |
| Silwet 408 | 0.5 | | 1.0 |
| Silwet L-77 | 0.5 | 1.0 | |
| Water | 99.0 | 99.0 | 99.0 |
| Total % | 100 | 100 | 100 |

The following table presents the results of an experiment monitoring blockface hydration time, upon treatment with the formulations prepared as noted above employing the indicated trisiloxane surfactant or surfactants at equal concentrations.

TABLE 2

| {Prophetic example data for illustration only} | |
|---|---|
| Trisiloxane Formulation | Hydration Time |
| Silwet L-77 | 2 min |
| Silwet 408 | 1 min |
| Silwet L-77/Silwet 408 | 30 s |

As illustrated by the tabulated test results, it is clear that the reduction in hydration time achieved by employing the Silwet L-77/Silwet 408 blend is synergistically improved as compared with the results achieved by the individual component surfactants alone.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification, embodiments have been described in a way which enables a clear and concise specification to be written, but it is intended and will be appreciated that embodiments may be variously combined or separated without parting from the scope of the present disclosure. It is intended that the present disclosure be limited only to the extent required by the appended claims and the applicable rules of law.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the disclosure. It is intended that the present disclosure be limited only to the extent required by the appended claims and the applicable rules of law.

It is also to be understood that the following claims are to cover all generic and specific features of the disclosure described herein, and all statements of the scope of the disclosure which, as a matter of language, might be said to fall therebetween.

What is claimed is:

1. A system, comprising:
a first microtome;
a second microtome; and
a processor, the processor being programmed to cause a processing of a plurality of tissue blocks, wherein the processing comprises one or more of:
facing, by the first microtome or the second microtome, a tissue block of the plurality of tissue blocks; or
sectioning, by the first microtome or the second microtome, the tissue block of the plurality of tissue blocks,
wherein the processor causes the processing of the plurality of tissue blocks such that the plurality of tissue blocks are processed in tandem.

2. The system of claim 1, wherein:
the facing of a first tissue block of the plurality of tissue blocks is performed by the first microtome; and
the sectioning of a second tissue block of the plurality of tissue blocks is performed by the second microtome.

3. The system of claim 1, wherein:
the facing of a first tissue block of the plurality of tissue blocks is performed by the first microtome;
the facing of a second tissue block of the plurality of tissue blocks is performed by the first microtome while the first tissue block is hydrating; and
the sectioning of the first tissue block is performed by the second microtome while the second tissue block is being hydrated.

4. The system of claim 1, wherein the processor is programmed to cause transferring of one or more sections from the plurality of tissue blocks to one or more slides.

5. The system of claim 1, wherein:
the system further comprises a hydration system; and
the processor is programmed to cause transferring of the plurality of tissue blocks between the first microtome or the second microtome and the hydration system.

6. The system of claim 1, wherein:
the system further comprises a hydration system; and
the processor is programmed to cause:
a first tissue block of the plurality of tissue blocks to be hydrated by the hydration system for a first predetermined time; and
a second tissue block of the plurality of tissue blocks to be hydrated by the hydration system for a second predetermined time.

7. The system of claim 1, wherein the processor is programmed to cause the tissue block of the plurality of tissue blocks to be hydrated at the first microtome or the second microtome.

8. The system of claim 1, further comprising:
a block handler; and
a hydration system, wherein:
the processor is programmed to cause moving, by the block handler, the plurality of tissue blocks from the first microtome or the second microtome to the hydration system.

9. The system of claim 1, further comprising one or more transfer medium units, wherein:
the processor is programmed to cause moving, by the one or more transfer medium units, one or more sections sectioned from the plurality of tissue blocks to one or more slides.

10. A method, comprising:
facing, by one or more microtomes, a first tissue block comprising a first tissue sample embedded in an embedding material;
hydrating the first tissue block; and
facing, by the one or more microtomes, a second tissue block while the first tissue block is being hydrated, the second tissue block comprising a second tissue sample embedded in an embedding material.

11. The method of claim 10, wherein the first tissue block is hydrated for a predetermined time.

12. The method of claim 10, further comprising sectioning, by the one or more microtomes, the first tissue block.

13. The method of claim 10, further comprising moving the first tissue block and the second tissue block from the one or more microtomes to a hydration system configured for hydrating.

14. The method of claim 10, further comprising transferring one or more sections sectioned from the first tissue block and the second tissue block to one or more slides.

15. A system, comprising:
a first microtome;
a second microtome; and
a processor, the processor being programmed to cause a processing of a plurality of tissue blocks, wherein the processing comprises:
facing, by the first microtome, a first tissue block of the plurality of tissue blocks; and
sectioning, by the second microtome, the first tissue block of the plurality of tissue blocks,
wherein the processor causes the processing of the plurality of tissue blocks such that the plurality of tissue blocks are processed in tandem.

16. The system of claim 15, wherein:

the facing of a second tissue block of the plurality of tissue blocks is performed by the first microtome while the first tissue block is hydrating; and the sectioning of the first tissue block is performed by the second microtome while the second tissue block is being hydrated.

17. The system of claim 15, wherein the processor is programmed to cause transferring of one or more sections from the plurality of tissue blocks to one or more slides.

18. The system of claim 15, wherein:

the system further comprises a hydration system; and the processor is programmed to cause transferring of the plurality of tissue blocks between the first microtome or the second microtome and the hydration system.

19. The system of claim 15, wherein:

the system further comprises a hydration system; and the processor is programmed to cause:

the first tissue block of the plurality of tissue blocks to be hydrated by the hydration system for a first predetermined time; and a second tissue block of the plurality of tissue blocks to be hydrated by the hydration system for a second predetermined time.

20. The system of claim 15, wherein the processor is programmed to cause the first tissue block of the plurality of tissue blocks to be hydrated at the first microtome or the second microtome.

21. The system of claim 15, wherein:

the system further comprises a hydration system; and the processor is programmed to cause:

transferring of the plurality of tissue blocks between the first microtome or the second microtome and the hydration system;

the first tissue block of the plurality of tissue blocks to be hydrated by the hydration system for a first predetermined time; and a second tissue block of the plurality of tissue blocks to be hydrated by the hydration system for a second predetermined time.

22. The system of claim 15, further comprising:

a block handler; and a hydration system, wherein:

the processor is programmed to cause moving, by the block handler, the plurality of tissue blocks from the first microtome or the second microtome to the hydration system.

23. The system of claim 15, further comprising one or more transfer medium units, wherein:

the processor is programmed to cause moving, by the one or more transfer medium units, one or more sections sectioned from the plurality of tissue blocks to one or more slides.

24. A method, comprising:

facing, by one or more microtomes, a first tissue block comprising a first tissue sample embedded in an embedding material;

hydrating the first tissue block;

facing, by the one or more microtomes, a second tissue block while the first tissue block is being hydrated, the second tissue block comprising a second tissue sample embedded in an embedding material;

hydrating the second tissue block; and sectioning, by the one or more microtomes, the first tissue block while the second tissue block is being hydrated.

25. The method of claim 24, wherein the first tissue block is hydrated for a predetermined time.

26. The method of claim 24, further comprising moving the first tissue block and the second tissue block from the one or more microtomes to a hydration system configured for hydrating.

27. The method of claim 24, further comprising transferring one or more sections sectioned from the first tissue block and the second tissue block to one or more slides.

* * * * *